US005922040A

United States Patent [19]

Prabhakaran

[11] Patent Number: 5,922,040

[45] **Date of Patent: *Jul. 13, 1999**

[54] METHOD AND APPARATUS FOR FLEET MANAGEMENT

[75] Inventor: Sanjiv Prabhakaran, San Jose, Calif.

[73] Assignee: Mobile Information System, Inc., Sunnyvale, Calif.

[ * ] Notice: This patent is subject to a terminal disclaimer.

[21] Appl. No.: 08/706,211

[22] Filed: Aug. 30, 1996

Related U.S. Application Data

[63] Continuation-in-part of application No. 08/443,062, May 17, 1995, Pat. No. 5,636,122

[60] Provisional application No. 60/003,153, Sep. 1, 1995.

[51] Int. Cl.[6] .................................................. G06F 17/60

[52] U.S. Cl. .......................... 701/117; 701/208; 340/990

[58] Field of Search ................................ 701/208, 300, 701/207, 117; 340/990, 992, 993

[56] References Cited

U.S. PATENT DOCUMENTS

| | | | |
|---|---|---|---|
| 3,845,289 | 10/1974 | French | 235/151.2 |
| 4,360,876 | 11/1982 | Girault et al. | 364/449 |
| 4,513,377 | 4/1985 | Hasebe et al. | 364/449 |
| 4,570,227 | 2/1986 | Tachi et al. | 364/444 |
| 4,608,656 | 8/1986 | Tanaka et al. | 364/449 |
| 4,611,293 | 9/1986 | Hatch et al. | 364/571 |
| 4,613,913 | 9/1986 | Phillips | 360/51 |
| 4,630,209 | 12/1986 | Saito et al. | 364/444 |
| 4,660,037 | 4/1987 | Nakamura et al. | 340/990 |
| 4,672,565 | 6/1987 | Kuno et al. | 364/571 |
| 4,673,878 | 6/1987 | Tsushima et al. | 324/226 |
| 4,675,676 | 6/1987 | Takanabe et al. | 340/995 |
| 4,723,218 | 2/1988 | Hasebe et al. | 364/449 |
| 4,734,863 | 3/1988 | Honey et al. | 364/449 |
| 4,737,916 | 4/1988 | Ogawa et al. | 364/443 |
| 4,751,512 | 6/1988 | Longaker | 342/357 |
| 4,782,447 | 11/1988 | Ueno et al. | 364/449 |
| 4,788,645 | 11/1988 | Zavoli et al. | 364/449 |
| 4,796,191 | 1/1989 | Honey et al. | 364/450 |
| 4,797,841 | 1/1989 | Hatch | 364/571.04 |
| 4,831,563 | 5/1989 | Ando et al. | 364/571.05 |
| 4,862,398 | 8/1989 | Shimizu et al. | 364/571.05 |
| 4,873,513 | 10/1989 | Soults et al. | 340/723 |
| 4,891,650 | 1/1990 | Sheffer | 342/457 |
| 4,914,605 | 4/1990 | Loughmiller, Jr. et al. | 364/424.01 |
| 4,918,609 | 4/1990 | Yamawaki | 364/449 |
| 4,924,402 | 5/1990 | Ando et al. | 364/449 |
| 4,926,336 | 5/1990 | Yamada | 364/444 |

(List continued on next page.)

OTHER PUBLICATIONS

Allen, David P., "Here Be Dragons . . . ," *CD–ROM EndUser*, Mar. 1990.

French, R.L., "MAP Matching Origins Approaches and Applications," Robert L. French & Associates, 3815 Lisbon Street, Suite 201, Fort Worth, Texas 76107, pp. 91–116. Date Unknown.

Sena, Michael L.; "Computer–Aided Dispatching"; *Computers Graphics World*; Pennwell (Publ.); May 1990.

*Primary Examiner*—Michael Zanelli
*Attorney, Agent, or Firm*—Townsend and Townsend and Crew LLP

[57] ABSTRACT

The invention provides a system for fleet management having a main process 1501 and client processes 1503, 1505. The system has a graphical user interface user apparatus 1508 having a display and user interface such as a keyboard. The system also uses a main process manager 1501 operably coupled to the display 1508 through a central processor. The child processes include a current report receiver 1503 operably coupled to the display through said central processor, and a history report receiver 1505 operably coupled to the display through the central processor. The child processes are also each operably coupled to a mobile information center, which provides vehicle position data and the like. This vehicle position data are received and transmitted to a fleet of vehicles (e.g., couriers, etc.) through the mobile information center.

41 Claims, 12 Drawing Sheets

U.S. PATENT DOCUMENTS

| | | | |
|---|---|---|---|
| 4,937,753 | 6/1990 | Yamada | 364/449 |
| 4,954,959 | 9/1990 | Moroto et al. | 364/449 |
| 4,964,052 | 10/1990 | Ohe | 364/449 |
| 4,970,652 | 11/1990 | Nagashima | 364/449 |
| 4,982,332 | 1/1991 | Saito et al. | 364/449 |
| 4,984,168 | 1/1991 | Neukrichner et al. | 364/449 |
| 4,989,151 | 1/1991 | Nuimura | 364/449 |
| 4,992,947 | 2/1991 | Nuimura et al. | 364/444 |
| 4,996,645 | 2/1991 | Van der Zon | 364/449 |
| 4,999,783 | 3/1991 | Tenomoku et al. | 364/450 |
| 5,003,317 | 3/1991 | Gray et al. | 342/457 |
| 5,040,122 | 8/1991 | Neukirchner et al. | 364/449 |
| 5,046,011 | 9/1991 | Kahikara et al. | 364/449 |
| 5,060,162 | 10/1991 | Ueyama et al. | 364/449 |
| 5,067,081 | 11/1991 | Person | 364/444 |
| 5,109,399 | 4/1992 | Thompson | 379/45 |
| 5,122,959 | 6/1992 | Nathanson et al. | 364/436 |
| 5,140,532 | 8/1992 | Beckwith, Jr. et al. | 395/101 |
| 5,155,689 | 10/1992 | Wortham | 364/460 |
| 5,177,685 | 1/1993 | Davis et al. | 364/443 |
| 5,222,690 | 6/1993 | Jeffords | 244/1 R |
| 5,243,530 | 9/1993 | Stanifer et al. | 364/452 |
| 5,272,638 | 12/1993 | Martin et al. | 364/444 |
| 5,283,743 | 2/1994 | Odagawa | 364/457 |
| 5,287,297 | 2/1994 | Ihara et al. | 364/571.02 |
| 5,297,049 | 3/1994 | Gurmu et al. | 364/436 |
| 5,297,050 | 3/1994 | Ichimura et al. | 364/444 |
| 5,311,195 | 5/1994 | Mathis et al. | 342/357 |
| 5,334,974 | 8/1994 | Simms et al. | 340/990 |
| 5,428,546 | 6/1995 | Shah et al. | 364/449 |
| 5,434,788 | 7/1995 | Seymour et al. | 364/449 |
| 5,470,233 | 11/1995 | Fruchterman et al. | 434/112 |
| 5,485,161 | 1/1996 | Vaughn | 342/357 |
| 5,487,139 | 1/1996 | Saylor et al. | 395/135 |
| 5,604,676 | 2/1997 | Penzias | 705/417 |
| 5,677,837 | 10/1997 | Reynolds | 364/424.028 |

METHOD AND APPARATUS FOR FLEET MANAGEMENT

CROSS-REFERENCE TO RELATED APPLICATIONS

This application is a continuation-in-part of application Ser. No. 08/443,062 filed May 17, 1995, now U.S. Pat. No. 5,636,122; issued Jun. 3, 1997 and is a continuation-in-part of Provisional Application Serial No. 60/003,153 filed Sep. 1, 1995, all in the name of the present assignee. This application is also related to application Ser. No. 08/443, 063, now U.S. Pat. No. 5,758,313 filed May 17, 1995, in the name of the present assignee. Furthermore, this application is related to application Ser. Nos. 08,697,825 and 08/706, 341 filed on the same date of this present application, all in the name of the present assignee. All of these documents are hereby incorporated by reference for all purposes.

BACKGROUND OF THE INVENTION

The present invention relates to a technique for fleet management. The present invention is illustrated as an example with regard to a technique for computer aided dispatching of a fleet of vehicles by way of a map presented on a display, but it will be recognized that the invention has a wider range of applicability. Merely by way of example, the invention can be applied to other types of transportation, mapping, and the like.

As the world has become more industrialized and populated, transportation requirements also have increased rapidly. In particular, the number of vehicles such as automobiles, trucks, vans, and the like on typical city highways has increased to levels such that traffic jams are now a way of life for a typical driver using these highways as a means for travel. In fact, some of these highways are so constricted that anyone using them can experience significant delays often unexpectedly due to problems such as accidents, road construction, and others. These problems also exist on other transportation ways such as our city streets, airways, and waterways. Accordingly, it is often difficult to predict with any accuracy the location of a vehicle using these transportation ways.

Cities and governments have attempted to resolve some of these problems by adding more transportation infrastructure to highly populated areas. This infrastructure often comes in the form of improved roads or highways, train systems, and the like. Unfortunately, roads, highways, and train systems are often difficult to build in highly populated areas and are generally extremely expensive and time consuming to build. In most cases, construction used to provide this additional infrastructure often causes even more traffic congestion and other problems.

Based upon this state of the transportation infrastructure in most industrialized countries, it is often difficult for a company involved in transportation services such as courier services, long haul trucking, air freight, etc. to accurately track its vehicles and deliveries. The problems mentioned above severely limit the predictability for a fleet manager to track vehicles in its fleet for the pick-up and delivery of information, packages, and people.

Industry also has attempted to resolve some of these problems. For instance, some companies are now providing their drivers with cellular phones and radios so that the dispatcher can communicate with them. Other companies retrofit their vehicles with navigational systems such as LORAN or a global positioning system (GPS) to determine vehicle location. Still other companies are using maps and GPS to track vehicle location by dispatchers at a central office terminal.

One such company is Mobile Information Systems, Inc. ("Mobile Information Systems"), assignee of the present application, which pioneered a technique for implementing easy-to-read maps for tracking vehicle location on a display or workstation at the central office terminal or any terminal. In particular, Mobile Information Systems implemented one of the first techniques for using a raster-type map and vector data for referencing vehicle location. The raster-type map used on a display had features that were easy-to-read for a dispatcher or user. These features were generally geographical in nature and were easier to reference than the maps made using predominantly stick-type representations of geographical features. The techniques used by Mobile Information Systems have partly overcome some of the daily problems faced by a fleet manager or the like. It would, however, be desirable to develop other techniques for integrating further aspects of fleet management.

Based upon the above, it would be desirable to develop techniques for further improving the predictability, efficiency, and accuracy of fleet management or tracking any object that can be transported into our roadways, highways, waterways, airways, and the like.

SUMMARY OF THE INVENTION

According to the present invention, a technique is disclosed for fleet management using a main process and client processes for providing vehicle position data to a graphical user interface apparatus.

In a specific embodiment, the present invention provides a system for fleet management having a main process and client processes. The system has a graphical user interface apparatus having a display and user interface such as a keyboard. The system also uses a main process manager operably coupled to the display through a central processor. The child processes include a current report receiver operably coupled to the display through said central processor, and a history report receiver operably coupled to the display through the central processor. The child processes are also each operably coupled to a mobile information center, which provides vehicle position data and the like. This vehicle position data are received and transmitted to a fleet of vehicles (e.g., couriers, etc.) through tie mobile information center.

According to a preferred embodiment of the present invention, a system for fleet management includes a graphical user interface apparatus including a display and user interface. The display includes a central processor, a main process manager operably coupled to the display through the central processor, a current report receiver operably coupled to the display through the central processor, and a history report receiver operably coupled to the display through the central processor.

According to another preferred embodiment of the present invention, a system used for fleet management includes a client process operably coupled to a user interface apparatus. The client process provides vehicle position data to the user interface apparatus. The vehicle position data includes a vehicle latitude/longitude and a vehicle address. The system used for fleet management also includes a geocoder operably coupled to the client process. The geocoder includes a search engine and a library. The library includes latitude and longitude data and address data. The geocoder converts the vehicle latitude/longitude into the vehicle address.

According to another preferred embodiment of the present invention, a method for fleet management includes the steps of providing a vehicle latitude/longitude from a vehicle. It also includes the steps of transferring the vehicle latitude/longitude into a client process, the client process being operably coupled to a user interface apparatus. It further includes the steps of converting the vehicle latitude/longitude using the search engine and the library in the geocoder to a vehicle address. The method for fleet management also includes the steps of using the vehicle address in a graphical user interface apparatus.

The novel features characteristic of the invention are set forth in the appended claims. The invention, however, as well as other features and advantages thereof, will be best understood by reference to the detailed description which follows, when read in conjunction with the accompanying drawings.

DESCRIPTION OF THE SPECIFIC EMBODIMENT

DEFINITIONS

In describing the embodiments below, it may assist the reader in defining the abbreviated terms as follows:

API Application Program Interface
AVL Automatic Vehicle Location
CAD Computer Aided Dispatching
IPC Inter-Process Communications
MDS Mobile Data Suites
MDT Mobile Data Terminals
MIC Mobile Information Center
MIC-RUN MIC Database Runtime Process
CMIC Centralized Mobile Information Center
MPM Main Process Manager
MID Mobile Interchange Data
MTS Mobile Tracking Station
TCP/IP Transport Communication Protocol/Internet Protocol
TWM Two-Way Messaging
SCB System Controller Board These definitions are intended to assist the reader in understanding some of the present embodiments. They should, however, not limit the scope of the claims as defined herein. One of ordinary skill in the art would recognize other variations, modifications, and alternatives. In addition, other terms ordinarily used in the art could even replace some of the aforementioned terms, depending upon the application.

DISPLAY TECHNIQUES

Figure 1:
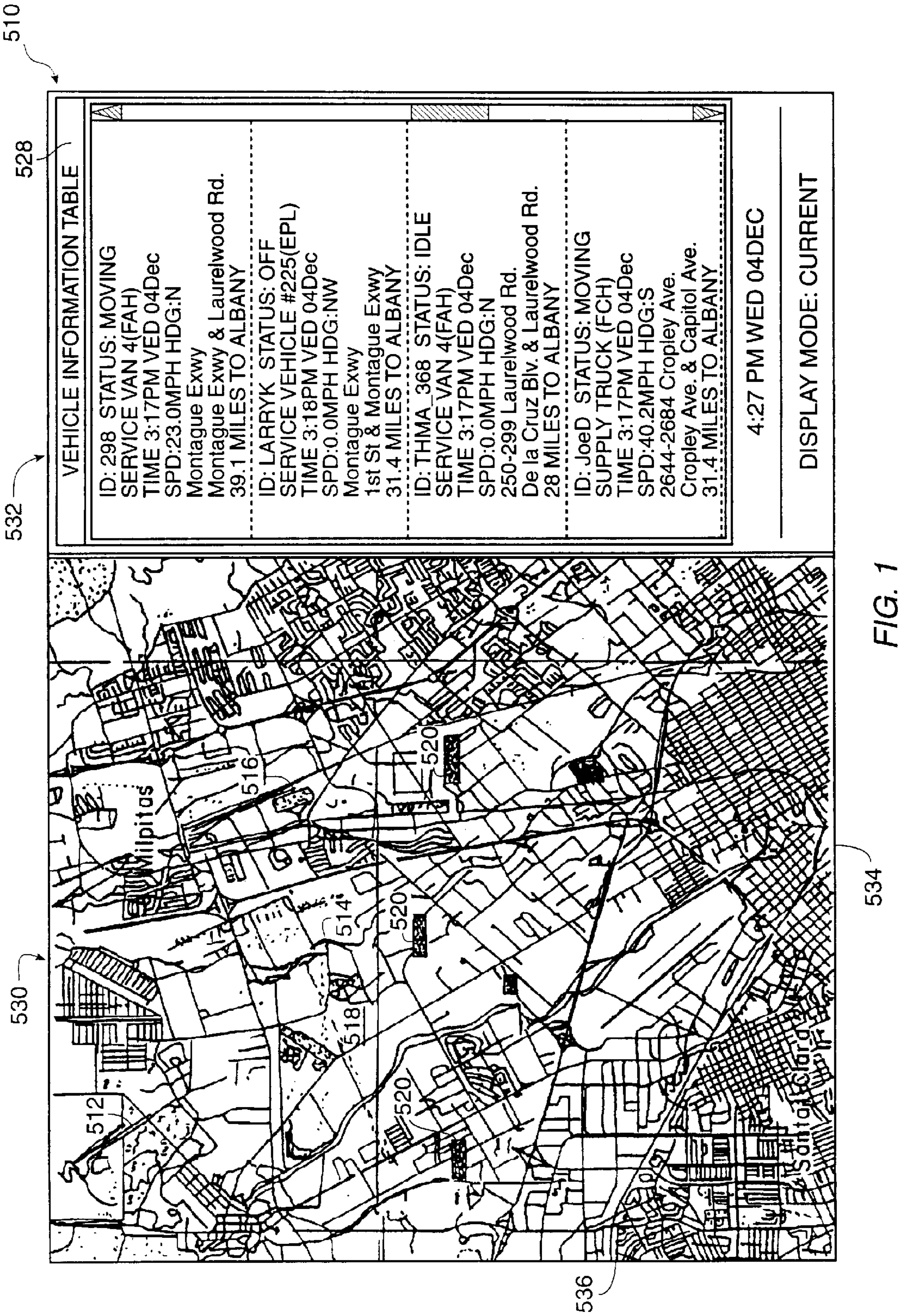
FIG. 1 is a simplified raster map display according to the present invention.

FIG. 1 illustrates an integrated raster map display according to an embodiment of the present invention. The raster map 510 includes natural features such as marshlands 512, creeks 514, and the like. The raster map 510 also includes manmade features such as the Auto Assembly Plant 516, Agnews Hospital 518, and others. The raster map is, for example, a digitally scanned road map, a digitally scanned automobile road map, a raster image in digital form, a pre-existing digital map without intelligent information, a digital map in TIFF format, a digitized video image, a digitized satellite image, or the like. Of course, the raster map can also generally be almost any type of digital map with substantially clear features without intelligent street information or the like.

Icons 520 show the position of the vehicles identified in the vector information table 528. But it will be recognized that the icons can also represent any mobile entities such as automobiles, vans, trucks, ambulances, animals, people, boats, ships, motorcycles, bicycles, tractors, moving equipment, trains, courier services, container ships, shipping containers, airplanes, public utility vehicles, telephone company vehicles, taxi cabs, buses, milk delivery vehicles, golf carts, beverage delivery vehicles, fire trucks and vehicles, hazardous waste transportation vehicles, chemical transportation vehicles, long haul trucks, local haul trucks, emergency vehicles, and the like. The icons can represent any mobile or potentially mobile entity or the like.

The vector information table 528 indicates selected geographic and cartographic information retrieved from, for example, the vector database. The vector information table 528 provides intelligent street information such as block number, address information, nearest cross-section of major streets, and the like with reference to the vehicle position. The vector table can also provide information about vehicle speed, vehicle heading, an activity status, a time status, and the like.

The display shown in FIG. 1 can be divided into at least two regions or segments such as a raster display segment 530, a vector information display segment 532, and others. The raster display segment 530 includes a first and second axis 534, 536 representing the latitudinal and longitudinal position of the vehicle position, respectively. Alternatively, the raster display segment may be in cylindrical or polar coordinates, and may not be limited to two dimensions.

A digitized map of the region through which the vehicle travels is displayed in the first segment of the display 530, adjacent to the first and second axis 534, 536. As noted above, each vehicle is represented as an icon. The icons may be color coded relative to a status chart and the like. Of course, the shape and color of each icon depend upon the particular application.

In an alternative embodiment, the present display can include additional features such as those discussed in U.S. application Ser. Nos. 08/697,825 and 08/706,341, filed on the date of this application and assigned to the present assignee, which are hereby incorporated by reference.

BLOCK DIAGRAMS OF SYSTEMS FOR FLEET MANAGEMENT

Figure 2:
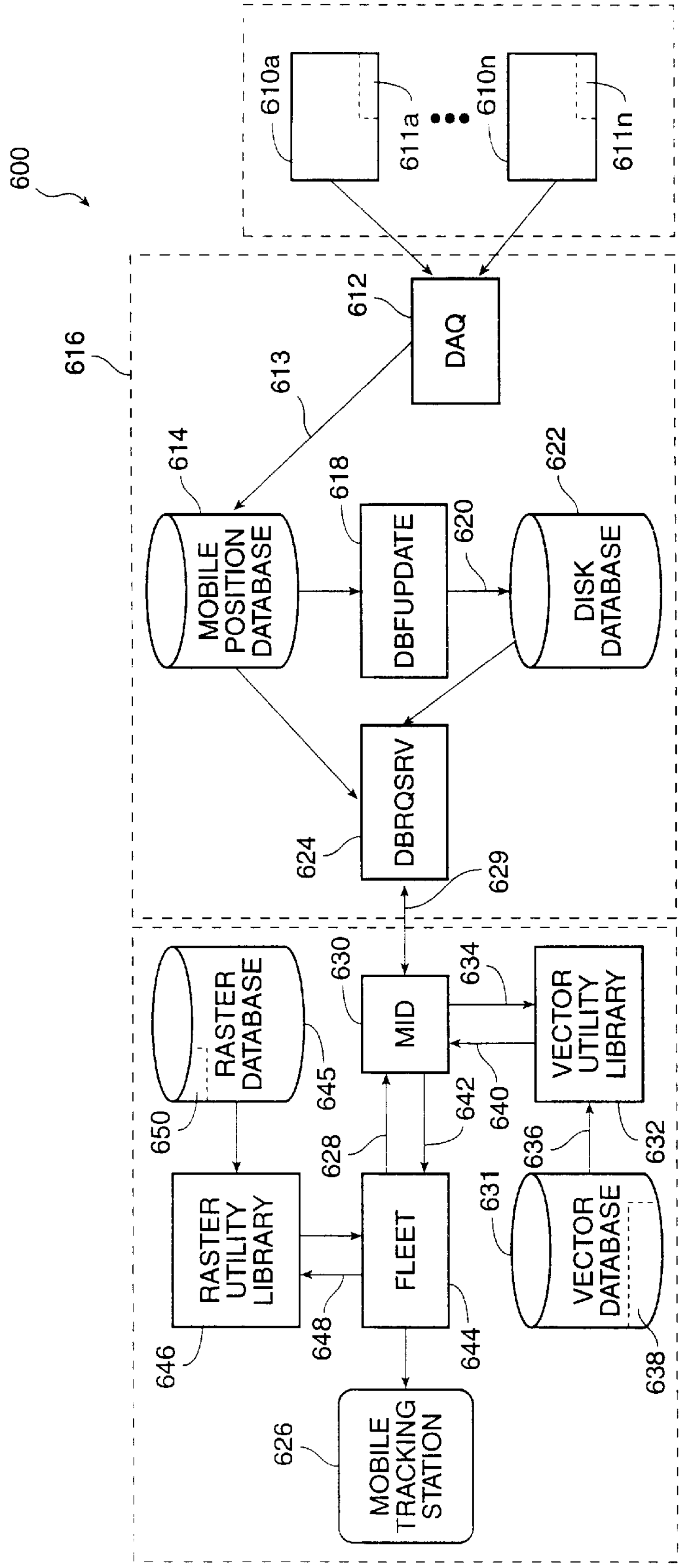
FIG. 2 is a simplified block diagram of a fleet tracking system and the display of FIG. 1 according to an embodiment of the present invention.
Figure 3:
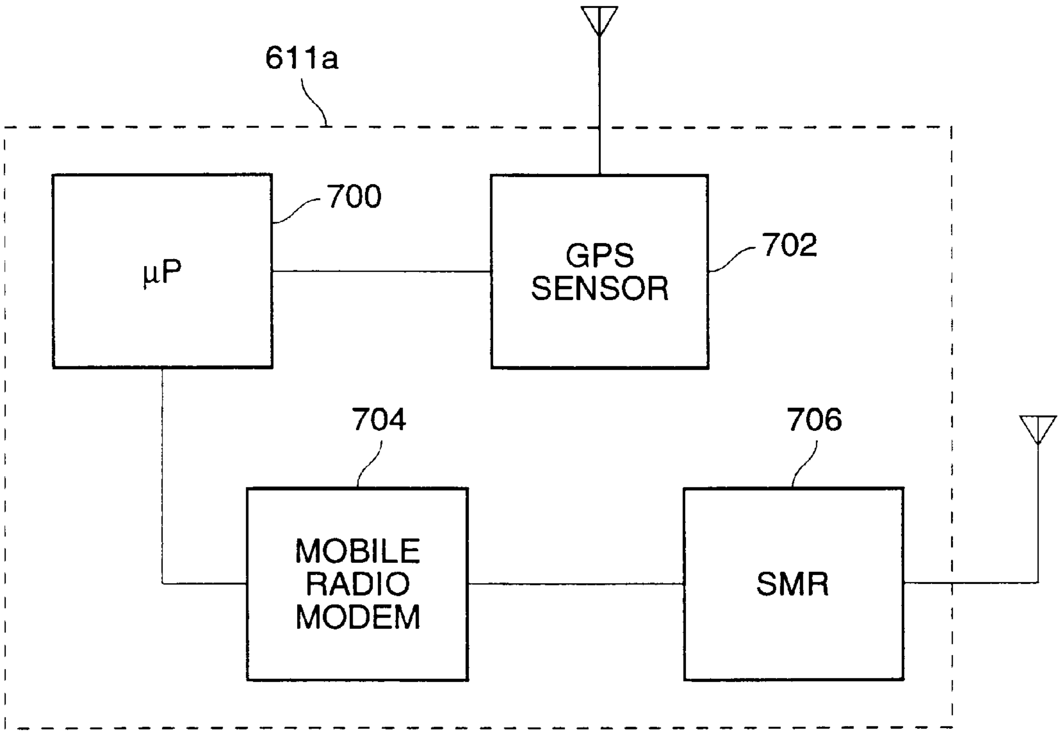
FIG. 3 is a simplified block diagram of a mobile radio of FIG. 2 according to an embodiment of the present invention.

FIG. 2 illustrates a block diagram of the fleet tracking system 600 for automatic vehicle location according to the present invention. Each vehicle 610*a*–610*n* includes a navigational tracking device hereafter called a fleet mobile data suite (MDS) 611*a*–611*n*. The fleet MDS 611 includes a microprocessor-controlled circuit 700 coupled to a GPS navigational sensor 702, a mobile radio modem 704, and a specialized mobile radio (SMR) 706 operational in the 800–900 Mhz frequency range, as illustrated by FIG. 3. The fleet MDS 611 continuously compiles latitude and longitude position data from the GPS sensor. Latitude and longitude position data is periodically transmitted to the data acquisition system 612.

The mobile position block 616 processes vehicle location information typically on a UNIX based computer. Other computer such as Windows NT, DOS, MacOs, etc. based computer, for example, are also contemplated for alternative embodiments of the present invention. The mobile position block 616 includes a data acquisition system 612, a mobile position database 614, a UNIX process DBFUPDATE 618, a disk database 622, and a UNIX process DBREQSRV 624. The data acquisition system 612 includes a personal computer coupled to both a base data link controller, and a specialized mobile radio (SMR) operational in the 800–900 Mhz frequency range. The data acquisition system 612 receives latitude and longitude position data from the fleet MDS 611, attaches a vehicle identifier to the navigational position data, and transmits the data block 613 (vehicle identification, latitude, longitude) to the mobile position database 614. Vehicle position is defined in terms of a latitude and longitude value during a predetermined time period.

The UNIX process DBFUPDATE 618 scans the mobile position database 614, preferably every 5 seconds, for any new information from the fleet MDS. The new data 620 is permanently stored in the disk database 622 for subsequent retrieval of historical information. Another UNIX process DBREQSRV 624 processes requests by the user from the mobile tracking station 626 for navigational position information. The mobile tracking station 626 can be a high resolution color UNIX workstation. User requests 628 are originated by mobile information data process 630, a UNIX process running on the mobile tracking station 626.

The mobile information data process 630 receives latitude and longitude position data for a particular vehicle. The mobile information data process 630 accesses the vector database 631 using the vector utilities 632. The vector utilities 632 match the latitude and longitude position information 634 to the latitude and longitude of street segment information 636 from the vector database 631. In addition, the vector utilities 632 match the latitude and longitude position information 634 to the latitude and longitude information of the cross-section of major streets 636 in the cross-section vector database 638. The cross-section vector database 638 can be a subsection of the vector database 631.

The nearest matching street segment, its street name and block number range, and the nearest cross-section of major streets, and its street name 640 are transmitted to the mobile information data process 630. The mobile information data process 630 attaches the street text information to the mobile position information and sends this data packet 642 to the fleet process 644.

The fleet process 644, a UNIX based process or the like, is the user interface display process. The fleet process 644 receives mobile position information and street text information from the mobile information data process 630. In addition, the fleet process 644 accesses the raster database 645 through the raster map utilities 646.

The raster map utilities 646 match the latitude and longitude mobile position 648 from the fleet MDS 611 to the various digitized raster maps data 650 in the raster map database 645. By specifying the zoom level option, using as an example, the X11/Motif graphical user interface on the mobile tracking station 626, the digitized raster map is displayed in one display window segment 530 and the corresponding street text information on another display window segment 532. A user locatable mark 520 represents the fleet MDS position for a particular vehicle. The icon 520 is positioned at the corresponding latitude and longitude location on the raster map display 530.

Historical data requests may be made by specifying a particular time period and a particular fleet MDS 611. The data request is sent by the fleet process 644 to the mobile information data process 630. The mobile information data (MID) process 630 in turn sends a request 628 to the DBRQSRV 624 process. The DBRQSRV 624 process accesses the disk database 622 and retrieves reports for the specific time period and fleet MDS 611. For every historical report sent back to the MID process 630, the above described process flow for accessing and displaying the raster map, vector street information, and displaying the user locatable mark representing the position of the navigational system is followed.

The vehicle display system includes at least three databases (a mobile position database 614, a raster database 645 and a vector database 631). The database information is interrelated by common latitude and longitude position data. A mobile tracking station 626 displays the position, raster and vector information in a format easily understood by the dispatcher or fleet manager.

The first database, the mobile position database 614, is a positional information database for storing vehicle position information received from the navigation systems. Navigational data transmitted from systems such as LORAN and GPS (Global Positioning System) is stored into data records indicating the latitude and longitude of a particular vehicle during a predetermined time interval. The DAQ process 612 is used to format position data received from the navigational system into the mobile position database 614. The vehicle identification is used as locator field to access the database for a particular vehicle. Vehicle position data is stored related to the vehicle identifier.

The second database, the raster database 645, is generated by digitally scanning a standard road map or paper map. The raster database 645 contains a digitized version of the visual features of the land for a specified region. Digitized raster information is stored in the raster database 645 in data records. Each data record corresponds to a digitized region having a particular latitude and longitude value. The latitude and longitude values are used as a locator field for accessing the raster database 645.

Figure 5:
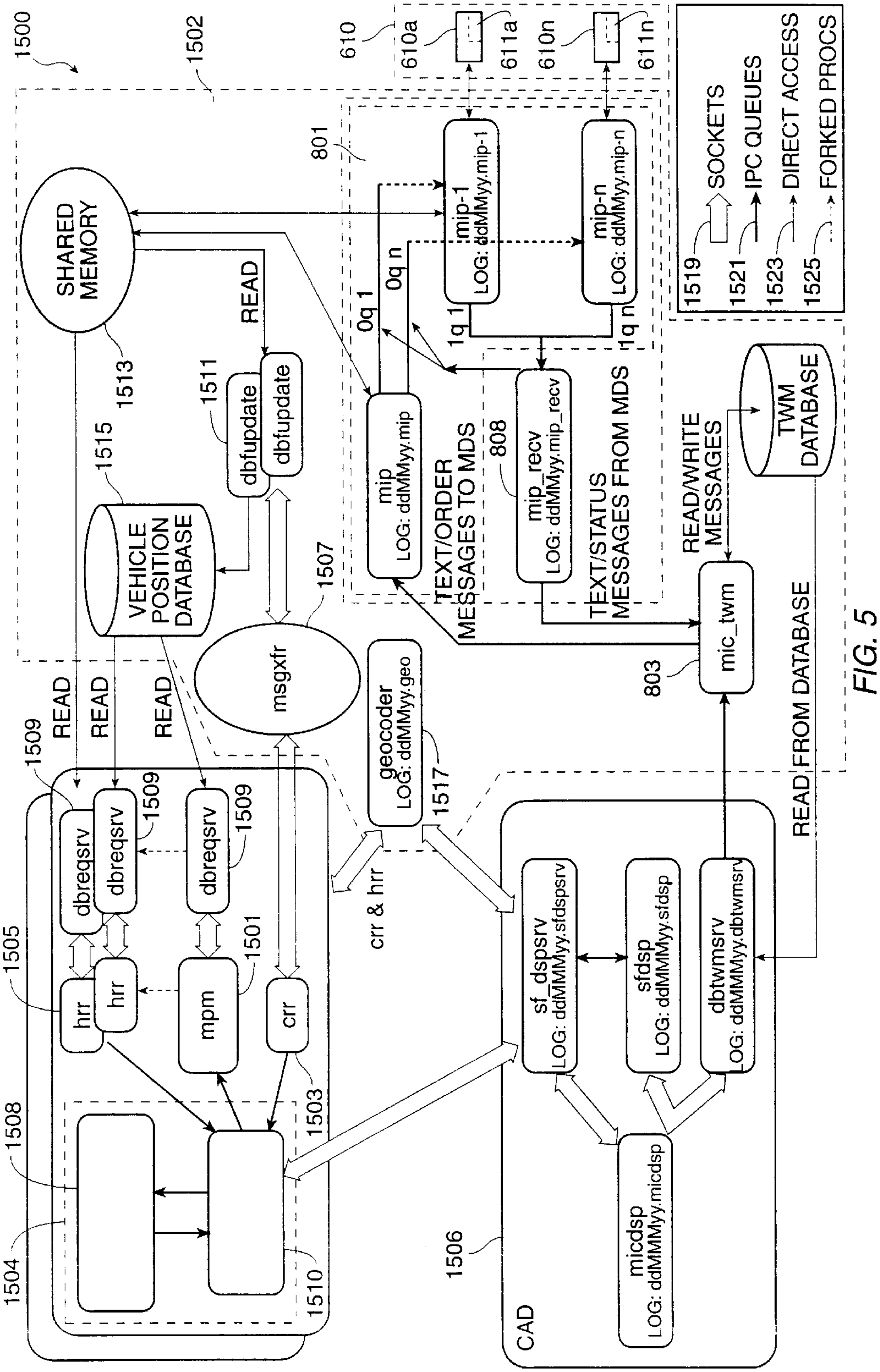
FIG. 5 is a simplified block diagram of a fleet tracking system and the display of FIG. 1 according to a further alternative embodiment of the present invention.

Data from both the raster database 645 and the mobile position database 614 are used in displaying the raster map and icon 520 in the first segment 530 of the display shown in FIG. 5. The fleet process 644 in combination with the raster map utilities 646, MID process 630, and vector map utilities 632 contains routines to access the mobile position database 614 and the raster map database 612. Both the mobile position database 614 and the raster map database 645 include a latitude and longitude field identifier. The raster map utility 646 in combination with the fleet process 644 and MID 630 matches the longitude and latitude values from the mobile position database 614 and the raster map database 645 and displays an icon 520 (representative of a particular vehicle) moving along the raster map as it changes its latitude and longitude position. The icon 520 moves according to the navigational data extracted from the mobile position database 614 for a particular vehicle. The icon 520 is also displayed in the first display segment 530. Since the latitude and longitudinal position of the icon 520 corresponds to a street location, the icon 520 moves along a particular street on the raster map display 530.

However, because the raster map is merely a digitized representation of the street, no interrelationship between different street locations or landmarks exists and intelligent street information is not displayed. A third database, the vector database 631, is needed to provide intelligent street information.

Vector address data and street information is publicly available from the US Census Bureau. The US Census provides GBF/DIME (Geographic Base Files/Dual Independent Map Encoding) files which are a common source of address data for dispatching applications. These files contain information describing the street network and other features. Each field record contains the segment name, address range and ZIP code. Node numbers for intersections are referenced to the vehicle latitude and longitude coordinate position.

A third database the vector database 631, contains vector information provided from GBF/DIME files. Vector information is displayed in the second display segment 532. The vector information displayed in segment 532 is typically displayed as text and relates intelligent street information corresponding to the latitude and longitude of a particular vehicle. Display segment 532 of FIG. 5 represents the vector text information.

The MID process 630 contains routines to access the mobile position database 614. Both the mobile position database 614 and the vector map database include a latitude and longitude field identifier. The vector utility 632 in combination with the MID process 630 contains routines to extract block number, street name, cross-section of major streets and other address related information and to match the longitude and latitude values from the mobile position database 614 to the vector map database 632. The mobile tracking station 626 displays the vehicle position on a raster map and corresponding address information simultaneously.

The steps for display of the integrated system include defining a coordinate system having a first axis representing the latitude of the vehicle position and a second axis representing the longitude of the vehicle position. Digitized information representative of a raster map is extracted from the raster database 645 and displayed adjacent to the first and second axes to form a raster map of a first predefined area.

Mobile position data from the GPS navigation system corresponding to vehicle latitude and longitude position during a predetermined time interval is extracted from the mobile position database 614. A user locatable mark 520 in the first display segment 530 corresponding to the latitude and longitude of the vehicle position is displayed. Intelligent street information is extracted from a third database, the vector database 631. Vector text information is displayed in a second segment 532 of the display. The vector text information corresponds to the latitude and longitude of the user locatable mark 520.

Figure 4:
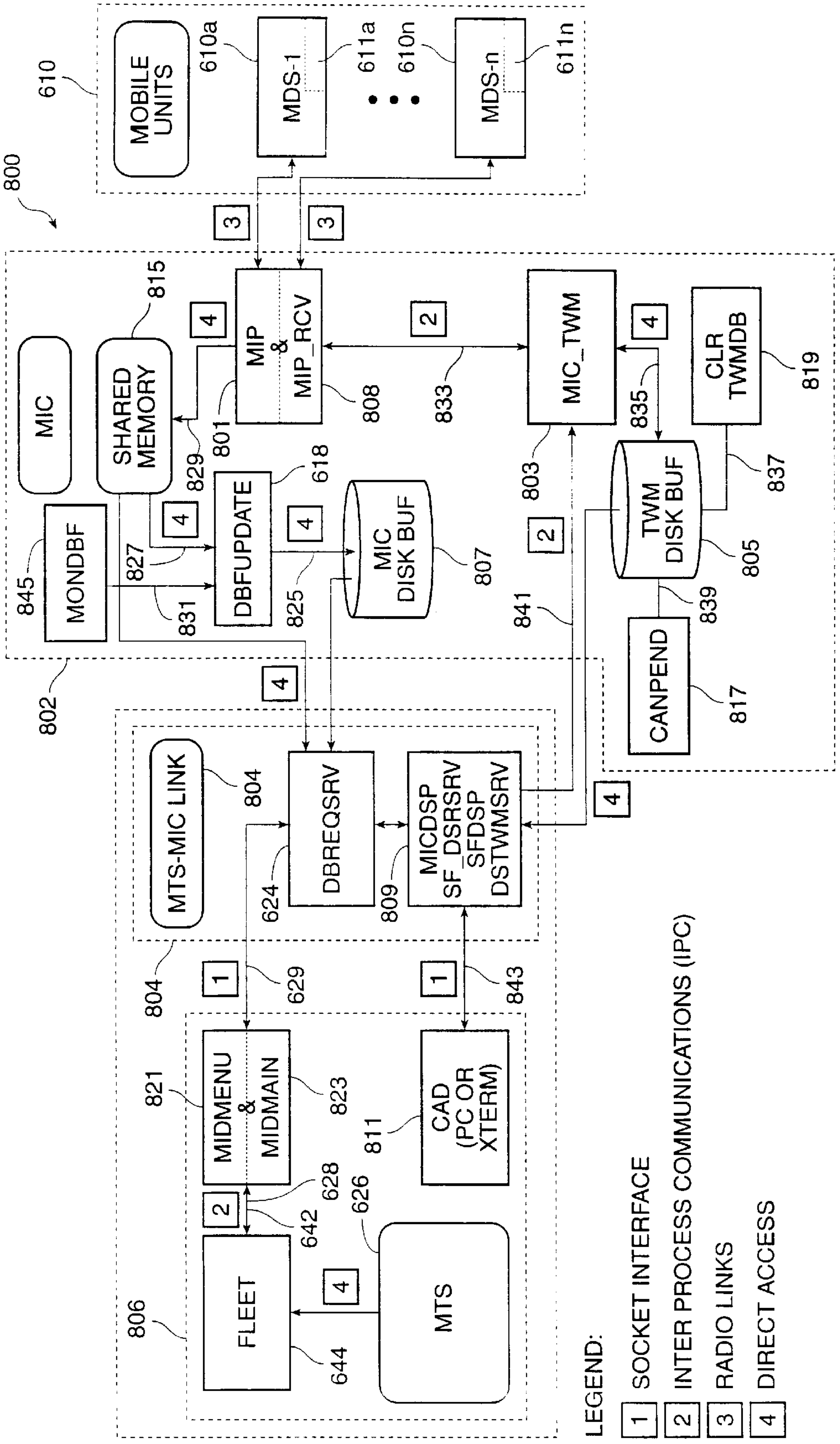
FIG. 4 is a simplified block diagram of a fleet tracking system and the display of FIG. 1 according to an alternative embodiment of the present invention.

FIG. 4 illustrates a simplified block diagram 800 of an integrated raster map display and information display according to an alternative embodiment of the present invention. The block diagram is merely a simplified illustration and should not limit the scope of the claims as defined herein. The block diagram provides functions for accessing mobile information center (MIC) databases and servers to handle subsystems such as an automatic vehicle location (AVL) system, a two-way messaging (TWM) system, a computer aided dispatch (CAD) system, and others. The simplified block diagram includes fleet mobile units 610, a mobile information center (MIC) 802, a mobile tracking system-mobile information center link (MTS-MIC LINK) 804, a mobile tracking system 806, among other features.

The mobile tracking system 806 includes system elements such as a mobile tracking station 626, a fleet process 644, a computer aided dispatch system 811, a mobile information data menu (MIDMENU) 821, a mobile information data main process (MIDMAIN) 823, and other elements. The mobile tracking system provides functions similar to the previous embodiment, but also has the computer aided dispatch system 811 and other elements. Selected system elements from the previous embodiment such as the mobile information data process 630, raster utility library 646, raster database 645, vector database 631, vector utility library 632 are combined within the MIDMENU & MIDMAIN 821, 823 process (hereinafter collectively "MIDMAIN"). A UNIX process such as the DBREQSRV 624 processes requests by a user from the mobile tracking station 626 for navigational position information. The mobile tracking station 626 can be any suitable high resolution color UNIX workstation or the like. User requests 628 originate at the MIDMAIN 821, 823 process which is a UNIX process running on the mobile tracking station 626.

The MIDMAIN 821, 823 process receives latitude and longitude position data for a selected mobile unit MDS-1 to MDS-n via line represented as 629. The MIDMAIN 821, 823 process accesses the vector database (or memory) 631 using the vector utilities. The vector utilities match the latitude and longitude position information to the latitude and longitude of street segment information from the vector database. The vector utilities also match the latitude and longitude position information to the latitude and longitude information of the cross-section of major streets in the cross-section vector database. The cross-section vector database is a subsection of the vector database, all within the MIDMAIN 821, 823 process or the like.

The MIDMAIN 821, 823 process via vector utility library retrieves the nearest matching street segment, its street name and block number range, and the nearest cross-section of major streets, and its street name and other information. The MIDMAIN 821, 823 process via mobile information data process attaches the street text information to the mobile position information and defines such information as a data packet or the like. The MIDMAIN 821, 823 process sends the data packet over a line represented as 642 to the fleet process 644.

The fleet process 644 is a user interface display process. The fleet process can be any suitable user interface display process such as a UNIX process or the like. The fleet process 644 receives mobile position information and street text information from the MIDMAIN 821, 823 process. The fleet process 644 accesses via line represented as 642 the raster database (or memory) through the raster map utilities, all in the MIDMAIN 821, 823.

The raster map utilities match the latitude and longitude mobile position from the fleet mobile units to the various digitized raster maps data in the raster map database. By specifying the zoom level option, using for example the X22/Motif graphical user interface on the mobile tracking station 626, the digitized raster map is displayed in one display window segment 530 and the corresponding street text information on another display window segment 532. A user locatable mark 520 (or icon) represents the fleet mobile units position for a particular vehicle. The icon 520 is positioned at the corresponding latitude and longitude location on the raster map display 530.

The display system includes at least three databases or memory locations and the like (a mobile position database 614, a raster database 645, and a vector database 631). The database information is interrelated by common latitude and longitude position data. The mobile tracking station 626 displays the position, raster and vector information in a format easily understood by the dispatcher or fleet manager. For example, the raster information includes a graphical representation of the raster map and icons graphically depict locations of the fleet mobile units on such raster map. Vector information is superimposed onto the raster map to provide intelligence. Other functions of the vehicle display system are similar to the previous embodiment.

In the fleet mobile units, each vehicle 610*a*–610*n* includes a navigational tracking device, hereinafter called a fleet mobile data suite (MDS-1 to MDS-n) 611*a*–611*n*. Each fleet MDS 611*a*–611*n* includes elements such as a microprocessor-controlled circuit coupled to a GPS navigational sensor and the like, a mobile radio modem, and a specialized mobile radio (SMR) operational in, for example, the 800–900 Mhz frequency range. But it would be recognized that the specialized mobile radio may be any type of wireless communication means such as cellular telephone, frequency modulated (FM) carrier means, cellular digital packet data means (CDPD), satellite communication, wide area wireless communication network (WAN) such a product called Ricochet™ sold by Metricom of Los Gatos, Calif., and others.

The mobile radio modem can also be a data modem, PCMCIA card modem, or the like for transporting data signals, voice signals, video signals, and the like. The fleet MDS 611*a*–611*n* compiles latitude and longitude position data from GPS sensors in a continuous manner and the like. Latitude and longitude position data are periodically transmitted at for example 5 minute increments or less to the mobile information center 802 block.

The automatic vehicle location system provides for vehicle tracking by way of selected elements from the fleet mobile units, the mobile information center, and other elements. The automatic vehicle system includes elements such as a UNIX DBFUPDATE server 618, a UNIX DBREQSRV server 624, a data acquisition and messaging interchange module (MIP or messaging interchange module) 801, a data acquisition and messaging interchange module and receive module (MIP_RCV) 808, a monitoring process (MONDBF) 813, and others. Also shown are a shared memory 815, a mobile information center (MIC) disk buffer 807, and other elements. Of course other types of servers and elements may be used depending upon the particular application.

In the automatic vehicle location system, the UNIX DBFUPDATE server 618 monitors the shared memory 815 via line represented as 827 for any new reports or updated reports. The UNIX DBFUPDATE server 618 transfers the reports from the shared memory 815 to the mobile information center disk buffer 807 in a periodic manner via line represented as 825. The reports include information such as a time, a vehicle location, a driver name, a vehicle number, a vehicle speed, a vehicle status, and others. The UNIX DBFUPDATE server 618 uses memory and file locking protocols to access data from the shared memory 614. The UNIX DBFUPDATE server 618 process runs continuously, transferring reports in data form from the shared memory 815 to the mobile information center disk buffer 807.

The shared memory 815 can be a dynamic random access memory which can store up to about 50 or less reports per vehicle. Accordingly, it is important that the data in shared memory 815 be transferred to the mobile information center disk buffer 807 before the shared memory fills up with data. For example, vehicles reporting every minute fill up the shared memory 815 in about 50 minutes or less, and the new data coming into the shared memory can be overwritten. Of course, as dynamic random access memory capacity increases, more reports can be stored in the shared memory 815.

The UNIX DBRQSRV 624 server processes requests from login to logoff from the automatic vehicle location subsystem, and in particular a workstation. The workstation can be any suitable workstation of sufficient memory and processing means to handle data as described herein. The UNIX DBRQSRV 624 server also forks out a copy of its process upon connection on a socket. The fork out process verifies login information and processes requests from each workstation. The UNIX DBRQSRV 624 server also provides for a different (or second) communication channel with the use of a computer aided dispatch (CAD-type) messages as will be described in more detail below. Other functions of the UNIX DBRQSRV were described in the previous embodiment.

An interface between fleet mobile units 610 and mobile information center disk buffer 807 is provided by the messaging interchange process (MIP) 801. In particular, vehicle position reports from the mobile units 610 are transferred to the shared memory 614 via line represented as 829. The UNIX DBFUPDATE server transfers the vehicle position reports into the mobile information center disk buffer 807 via line represented as 827. As previously noted, the vehicle position reports include at least latitude and longitude information at a selected time and the like.

The MIP_RCV process 808 assistants (or is an assistant) the messaging interchange process 801. In particular, the MIP_RCV process 808 receives data from the messaging interchange process 801 and processes the data to determine a forwarding path. For example, some data are sent back to the messaging interchange module 801 for forwarding to the fleet mobile unit(s) 610, and other data go into the shared memory 815 and/or the two way messaging disk buffer 805, among other elements. Of course, the MIP_RCV may also forward data to other elements of the mobile information center, mobile tracking station, and the like.

The automatic vehicle location system also includes the monitoring process such as the MONDBF 813 and the like. The MONDBF 813 is often dormant but periodically wakes up and checks the DBFUPDATE process 618 via line represented as 831. If the DBFUPDATE process 618 is not running, the MONDBF 813 outputs a warning message to an output device such as a screen or a printer, typically in standard UNIX shell script language or the like. The warning message alerts a user and appropriate action such as maintenance of the system or the like occurs. Of course, other forms of monitoring processes and/or systems may also be used depending upon the particular application.

The two-way messaging system provides for two-way messaging between the fleet mobile units 610 and, for example, a dispatcher or the like. The two-way messaging system is a "dumb" messaging system for communicating voice, data, video, and the like information between the fleet mobile units and the dispatcher and the like. The two-way messaging system includes elements such as a mobile information center two-way messaging module (MIC_TWM) 803, a UNIX server 809, a CANPEND process 817, a CLRTWMDB process 819, and others.

A message such as a two-way message and the like from one of the fleet mobile units goes to the MIC_TWM process from the message interchange module 801 via line represented as 833. A message from a dispatcher goes to the fleet mobile units through the MIC_TWM module (or process) 803 through the messaging interchange module 801 via lines represented as 841 and 833. The MIC_TWM module provides an interface between the dispatcher and the fleet mobile units 610 for two-way messaging. The MIC_TWM module also has write access to a two-way messaging (TWM) database 805 and other memory devices via line represented as 835. The MIC_TWM module has read access to the two-way messaging database 805 and other memory devices via line represented as 835. The MIC_TWM module also records in-coming (fleet mobile units to mobile information center) and outgoing (mobile information center to fleet mobile units) messages in the two-way messaging disk buffer or the like. The MIC_TWM module creates queues for communication between the messaging interchange 801 module, the UNIX DBTWMSRV server 809, and any other two-way messaging module, and is often started first in the two-way messaging system.

The CANPEND module 817 cancels pending messages via line represented as 839. Pending messages may be defined as messages sent to vehicles that are turned "off" or messages that need "acknowledgment" which are queued up as "pending" until they are delivered or acknowledged. The CANPEND module 817 reduces the likelihood of messages being piled up or the like. The CANPEND module 817 is preferably activated periodically to automatically cancel pending messages and the like. The cancelled messages are stored in the TWM disk buffer 805, and can be viewed via a HISTORY_DATA option, but the status is preferably displayed as "cancelled" in a selected display device.

The CLRTWMDB module (or process) 819 clears the two-way messaging disk buffer of incomplete message transactions in the event that the messaging interchange process 810 or the MIP_RCV 808 process is restarted. The CLRTWMDB module 819 clears status prompts such as message sent or message fail and other types of status prompts from the two-way messaging disk buffer, and leaves the messages as pending. The CLRTWMDB process 819 is often executed before the messaging interchange module process, but can also be executed at other times.

The computer aided (CAD) dispatch process provides dispatching for the fleet mobile units from the dispatch office. The computer aided dispatch process includes servers 809 such as a MICDSP server, a UNIX SF_DSPSRV server, a SFDSP server, and others. The computer aided dispatch also includes a system 811 (or module). The system or module can be any suitable computer aided dispatch software and hardware combination or the like.

The MICDSP server defines an interface to the CAD process 811 and other system elements such as the mobile tracking station 626, the fleet mobile units 610, and the like. The MICDSP server translates data coming from the CAD system 811 via line represented as 843 and formats the data into the mobile information center system specifications or the like. The MICDSP server passes data to the SF_DSPSRV process, a UNIX socket level interface process or the like.

The SF_DSPSRV server provides an interface between the MICDSP server and the SFDSP server. The SF_DSPSRV server deciphers different types of CAD messages and routes them to either the SFDSP or DBREQSRV servers. Messages from the fleet mobile units are sent to SFDSP server, while display and driver status type of messages are sent to the MTS station via the DBRQSRV process.

The SFDSP module provides a connection to the two-way messaging disk buffer for a store-n-forward mechanism. The SFDSP provides socket connection to the DBTWMSRV process and sends CAD messages via the two-way messaging disk buffer to the fleet mobile units. Statuses are returned to the CAD system by the fleet mobile data units via the SFDSP process. The SFDSP process also reads the SUPERUSR account information of the fleet mobile units at start-up time via a login packet transaction.

FIG. 5 is a simplified block diagram 1500 of a further embodiment of the fleet management system according to the present invention. This block diagram 1500 includes a fleet process 1508 and a dispatcher 1510. These elements can be similar to those described above. Preferably, these elements are similar to those described in U.S. application Ser. Nos. 08/697,825 and 08/706,341. As previously noted, these applications have been incorporated by reference herein for all purposes. Appendix I (not printed here but available in file wrapper) also provides a relatively detailed description of this embodiment of the present invention. It may assist the reader to reference Appendix I as necessary.

The block diagram 1500 also includes a mobile information center (MIC) 1502. The MIC includes a variety of processes (e.g., MDS 610, 611, MIP_RECV 808, MIC_TWM 803, MIP 801, TWM database (i.e., TWM DISK BUFFER, etc.), and others), which are essentially the same as the previous embodiments, and will generally not be discussed further, except in relation to the additional elements of block diagram 1500. Similar processes could be used to replace MIC_TWM, MIP, and others. In fact, these processes could be further combined or separated, depending upon the application. This MIC also includes shared memory and locks 1513, disk database and locks 1515, and geocoder 1517, among others, which are all described in detail below.

A computer aided dispatch process (CAD) 1506 is coupled between the MIC 1502 and fleet process 1508. This CAD process 1506 can be any suitable CAD-type unit. Preferably, the CAD process is similar to the one described below. Of course, other types of CAD processes can be used depending upon the application.

The simplified block diagram 1500 includes a variety of communication means or devices for providing communication lines, routes, or bridges between the elements of the block diagram. These means or devices include sockets 1519, inter-process communications (IPC) queues 1521, direct access 1523 and forked process routes 1525 to connect the above process elements. For easy reading, these connections are illustrated by different types of lines/arrows as shown in FIG. 5 and defined by the legend.

Block diagram 1500 has various server processes for providing communication between the MIC 1502 and fleet process 1508. These server processes include a main process manager (MPM) 1501, a current report receiver 1503, a history report receiver 1505, a MSGXFR server process 1507, a DBREQSRV server process 1509, a DBFUPDATE server process 1511, and others. Of course, these server elements could be combined or functions therein could be separated, depending upon the application. These server elements are discussed in further detail below. For easy reading, these elements have been separated in sections by block letters A, B, C, D, etc.

A. Main Process Manager

The main process manager (MPM) 1501 provides one or more communication channels between the fleet process and the mobile information center 1502 (MIC) or centralized mobile information center (CMIC). A centralized mobile information center is defined as a MIC all in substantially a single geographical location (e.g., central office, etc.). MPM spawns child processes (which will be discussed below) to provide these communication channels. In most embodiments, the MPM is accessed through a login screen from the fleet process, but can also be accessed through other devices. A separate UNIX process can be used to create the MPM, but can be created by way of other types of processes.

In a specific embodiment, the MPM opens a socket connection to the DBREQSRV upon selected inputs from the login screen of the fleet process. These inputs can be a user name and password, for instance. The socket connection is used to validate the user name and password and is used to query the list of vehicles to be tracked by the fleet process upon start-up. In particular, the MPM connects to the DBREQSRV to validate information such as a user name and password. The MPM also queries a list of vehicles to be tracked from the DBREQSRV and creates a vehicle file, which is stored in memory. Other applications such as the fleet process and the current report receiver (CRR) process, which will be described below, are launched from the MPM. The MPM also transfers vehicle position reports (gathered from the DBREQSRV) to the fleet process for further processing.

Figure 6:
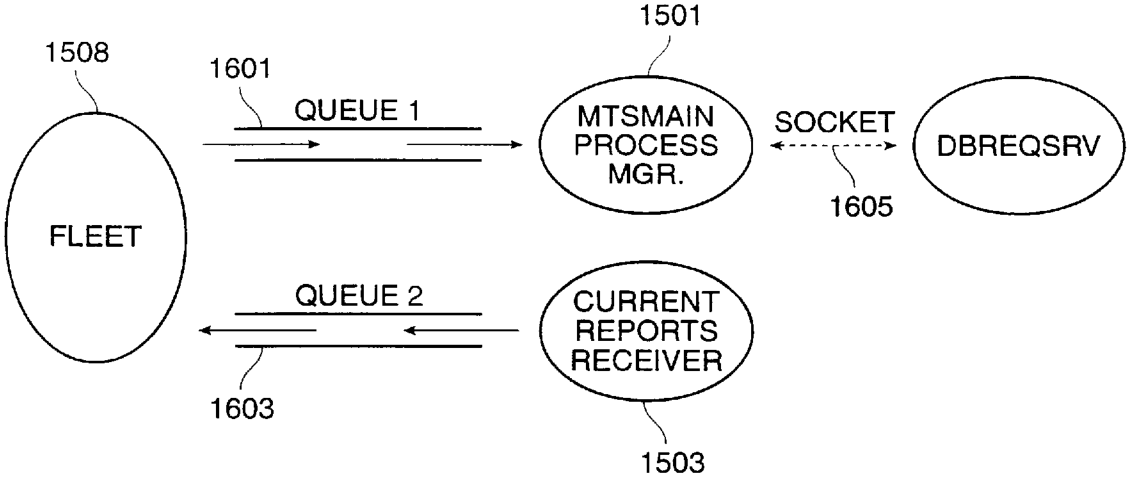
FIG. 6 is a simplified flow diagram of a fleet process (i.e., a graphical user interface apparatus having a keyboard) according to an embodiment of the present invention.

The MPM creates a plurality of IPC queues 1601, 1603 for exchanging messages with the fleet process 1508, as shown by FIG. 6. Some of these IPC queues are used by the MPM 1501, fleet process 1508, and current report receiver 1503 process. As illustrated, the MPM 1501 interfaces with the fleet process 1508 through queue 1 1601 and the current report receiver 1503 interfaces with the fleet process 1508 through queue 2 1603. Other queues are provided for the history report receiver (HRR) and for other processes.

The current report receiver 1503 receives data (e.g., latitude/longitude, etc.) about vehicle positions at a selected time from other processes such as MSGXFR and the like, and transfers them to the fleet process 1508. In an embodiment, this data will be used by the fleet process to update the vehicle icons on the display. The data also can be used by the fleet process for other applications too.

Messages initiated from the user at the fleet end use queue 1 and are read by the MPM, which is socketed 1605 to the DBREQSRV. As noted above, these messages can be transferred to a variety of processes, including the vehicle position database, and others. Of course, this depends upon the application.

Figure 7:
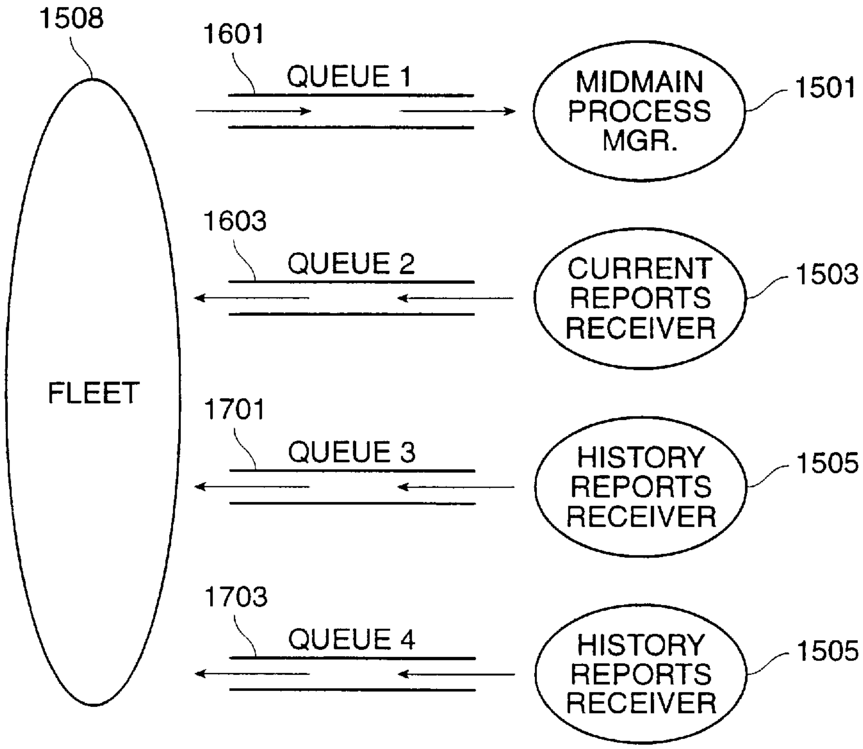
FIG. 7 is a simplified flow diagram of a fleet process according to an alternative embodiment of the present invention.

History data can be retrieved through one of the queues 3 and 4, as shown by FIG. 7. For instance, when an end user initiates a historical request, the MPM establishes a new socket connection to the DBREQSRV. Once this socket connection is established, the MPM spawns off a child process called history report receiver (HRR), and hands over the socket connection to this child. A queue is also identified to allow communication between the fleet process and the history report receiver. In particular, an existing queue (e.g., queue 3, 4, 5, etc.) is flushed and used. The history report receiver collects historical data from the DBREQSRV and hands them over to the fleet process for use. Each time a new history request is initiated by the user through the MPM, a new history reports receiver is spawned, as depicted by FIG. 7. When a selected amount (or all) historical data are collected and sent to the fleet process via MPM, the history report receiver is made.

The MPM also creates a vehicles file, which is defined as the list of vehicles tracked by the fleet process. The list is first queried from the DBREQSRV after the user authentication at start-up. The MPM provides a command line interface through which it can be signalled to request the list of vehicles. This interface also allows new vehicles to be added to the list and tracked without exiting the fleet process. For instance, a signal (e.g., SIGHUP, which will be defined below) to the MPM updates the vehicle file. The MPM then notifies the fleet process and current report receiver about the vehicle file, which has been updated with the new vehicle. In particular, the MPM queries DBREQSRV for a new list of vehicles and then sends a Read Vehicles File message to the fleet process to notify the fleet process about the list of new vehicles to be tracked.

The MPM processes at least the following signals:

SIGHUP

Upon receiving this signal, the MPM queries the new list of vehicles from DBREQSRV and updates the vehicles file.

SIGCLD

The MPM makes arrangements to process SIGCLD signals. This signal is generated (by UNIX) upon death of a MPM's child process. Upon receiving this signal, MPM determines the process id and the exit status of the dead child. The exit status of the child process is used to determine if the child process had an abnormal death. The following table describes the actions taken upon abnormal death of any child process:

TABLE 1

Actions undertaken by MPM for child process death

| Child Process | Action(s) |
|---|---|
| HRR | Send Abnormal History Exit message to the fleet process |
| CRR | Send SIGTERM to the history report receiver(s), if any<br>Send MtsMain Exit to the fleet process<br>Perform cleanup and exit |
| Fleet Process | Send SIGTERM to the history report reciever(s), if any<br>Send SIGTERM to the current report receiver<br>Perform Cleanup and exit |

SIGUSR1

This signal can be used to change the debug level for printing debug messages. Every time this signal is received, MPM increases the debug level. If already at the highest debug level, the signal changes the debug level to the lowest.

In most embodiments, the MPM performs a variety of clean functions. In particular, MPM does not exit until all it's child processes die. Upon death of the last child, the MPM deletes all the IPC queues created at start-up time.

In general, the MPM performs a variety of functions. These functions include at least the following tasks:

1. Connects and logs into the DBREQSRV server as a client process for a given user;
2. Queries the list of vehicles to be tracked and creates the vehicles file;
3. Queries the last received position report for each vehicle upon start-up;
4. Creates at least the child processes including the fleet process, current report receiver, and history report receiver;
5. Maintains the list of active child processes and makes arrangements for notification when any of the child processor exits;
6. Manages (e.g., creates and deletes) IPC queues used by the child processes for exchanging messages;
7. Maintains a mapping function between a fleet process map window operating in history mode, the corresponding history report receiver process, and the IPC queue being used by the history report receiver process to send data to the fleet process map window;
8. Reads messages generated by the fleet process and takes appropriate action depending upon the type of the message.

The MPM also interacts with the fleet process using a variety of messages. Among others, the following message types are exchanged between MPM and the fleet process. These are messages from the fleet process to the MPM.

Ready Message

This is one of the first messages received by MPM. MPM spawns the current report receiver process upon receipt of this message.

Exit Message

Upon receiving this message, MPM does these functions including: send SIGTERM to current report receiver process; send SIGTERM to history report receiver, if any; and send a close connection message to DBREQSRV.

After performing the above steps, the MPM waits for its child processes to die. When the last child dies, the MPM deletes all the IPC queues and exits.

History Request Message

Upon receiving this message, MPM identifies an IPC queue connect to DBREQSRV requesting historical data. After the connection is established, the MPM spawns a history report receiver process and hands over the connection to the this newly created process. If a new connection to DBREQSRV is not acquired, MPM sends an Abnormal History Exit message to the fleet process.

Cancel History Message

This message is sent by the fleet process when the end user cancels a history request. Upon receiving this message, MPM sends a SIGTERM signal to the corresponding history report receiver.

Request Vehicle Position

Upon receiving this message, MPM sends this message to DBREQSRV requesting the latest position of the given vehicle. The MPM does not wait for a response because the response to this request comes via the current report receiver process.

Other messages are sent from MPM to the fleet process. These messages include at least:

Read Vehicles File

This message is sent by MPM to indicate that the fleet process must read the vehicles file to get the list of vehicles to be tracked.

Vehicle Position Report

This message is sent at start-up time. It is used to send the last received vehicle report for every vehicle. These reports allow the fleet process to show the vehicle icons at start-up.

Abnormal History Exit

MPM sends this message to the fleet process indicating that the history report receiver died abnormally. Normally, the fleet process waits for a End of History Message from the history report receiver before sending a new history request. However, if the history report receiver is unable to send the End of History Message (due to its abnormal death) the Abnormal History Exit message allows the fleet process to request new history data. This message is written to the queue through which the fleet process was expecting the End of History Message.

Mtsmain Exit

This message is sent by MPM to the fleet process asking the fleet process to exit. The MPM can decide to exit upon encountering a fatal error, e.g., broken connections that cannot be restored, abnormal death of the current report receiver, etc. This message is written to queue connecting the current report receiver process to the fleet process.

The MPM also interacts with servers such as the DBREQSRV process. Examples of messages from the MPM to DBREQSRV include at least the following:

Request Login

This message is generated when the MPM is invoked. The purpose of Request Login is to request DBREQSRV to validate the end user name and password. After sending this message, the MPM waits for a response from DBREQSRV. If the login is successful, the fleet process and current report receiver processes are spawned off as discussed previously.

Request List of Vehicles

This message is sent by MPM to DBREQSRV to query the list of vehicles to be tracked. After sending this message, the MPM waits for a response from DBREQSRV. Upon obtaining the list, MPM writes this list into the vehicles file.

Request Vehicle Position

This message is sent by MPM to DBREQSRV to request the latest position of the given vehicle. This message is generated after receiving the Request Vehicle Position message from the fleet process. After sending this message, the MPM does not wait for any response.

Request Last Vehicle Report

At start-up time MPM uses this message to query the last received report about each vehicle. After the MPM sends this message, MPM waits for the data from DBREQSRV and sends the received data to the fleet process via queue 1.

Request New Channel

This message is generated by the MPM after it receives the History Request Message from the fleet process. This message is sent by MPM to DBREQSRV asking it for a new socket connection. After sending the message, the MPM waits for a port id (to connect to) from DBREQSRV. Upon receiving the port id, the MPM uses the port id to connect to the DBREQSRV process while listening on the other side of the socket. The MPM then spawns off a history report receiver process and hands over the newly established socket connection to it.

Close Connection

This message is sent by MPM to inform the DBREQSRV that no more data transfer is to take place between MPM and DBREQSRV. After sending the message to DBREQSRV, MPM closes the socket connecting to DBREQSRV.

Interaction also takes place from the DBREQSRV to the MPM. These interactions are in the form of at least the following messages:

Login Response

This message is received by MPM from the DBREQSRV in response to the previous Request Login message, which was from the MPM. The Login Request Login message from the DBREQSRV process informs the MPM whether the login attempt was successful or not.

Vehicle List Response

This message is received by MPM in response to the previous Request List of Vehicles from the MPM. This message packet contains the list of vehicles to be tracked by the user who has logged in.

New Channel Response

This message is received by MPM in response to the previous Request New Channel from the MPM. This message packet contains the port id of the newly created channel (to DBREQSRV).

Vehicle Data Response

This message received by MPM is in response to Request Last Vehicle Report from the MPM. This message packet contains the queried data.

The MPM has a variety of connection recovery features. The MPM is connected to DBREQSRV via socket. If messages cannot be read or written to the socket, the connection is assumed broken. In such a situation, the MPM retries to connect to DBREQSRV for 'n' times, sleeping for 'm' seconds between each retry. If the connection cannot be restored, the MPM sends the Mtsmain Exit Message to the fleet process; sends the SIGTERM signal to the current report receiver; sends the SIGTERM signal to the history report receiver process(es), if any; performs cleanup; and exits. The number of retries (n) and the sleep time (m) between each retry can be read from the system configuration file. The MPM can also perform other connection recovery functions depending upon the application.

Of course, other functions can be performed by the MPM. These functions would be readily apparent to those of ordinary skill in the art. Accordingly, the above description should not limit the scope of the claims herein.

B. Current Report Receiver

Figure 8:
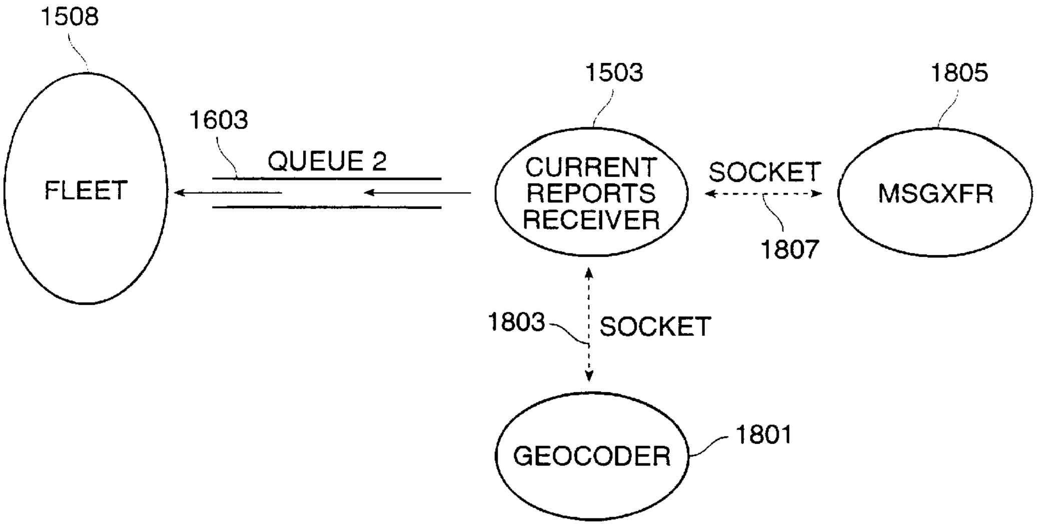
FIG. 8 is a simplified flow diagram of a fleet process according to a further embodiment of the present invention.

This process transfers current vehicle position reports from MIC to the fleet process. The current report receiver process is started by MPM but can also be started by other processes. Current report receiver 1503 generally receives messages from the MSGXFR process 1805, geocodes 1801 the vehicle position reports, and then transfers them to the fleet process 1508, as shown in FIG. 8. The current report receiver uses the services of the geocoder to geocode the received position reports. The communication channels (e.g., socket connections 1801, 1807 and queue 2) between the above processes are also illustrated by FIG. 8.

The current report receiver process assumes that the queue for sending data to the fleet process already exists at the time of its creation. The identifier of the queue is passed as a command line by its parent. The command line arguments in code can be:

<Qid> <Pathname of vehicles file> where

Qid Id of the queue to send data to the fleet process;

Pathname Complete pathname of file containing the list of vehicles to be tracked.

Upon start-up, the current report receiver process performs functions including: associates to queue 2 to send messages to the fleet process; connects as a client to MSGXFR to receive current vehicle reports; (The address (i.e., hostname, port number, etc.) of the MSGXFR is read from the system configuration file.) connects as a client to the geocoder; (The address of the geocoder is read from the system configuration file.) reads the vehicles file to obtain the list of vehicles being tracked. The current report receiver process then sleeps and waits for data to arrive over the socket from the MSGXFR process and others.

When the data arrives, they are checked to determine if the vehicle for which data are obtained is being tracked or not. If not, the message is discarded, alternatively, a request is sent to the geocoder for geocoding the location of the vehicle. Upon receiving the response from the geocoder server, the message is sent over to the fleet process. After sending the message to the fleet process, the current report receiver process goes off to sleep, waiting for the next message to arrive.

Generally, the current report receiver interacts with the fleet process via messages. Messages from the current report receiver to the fleet process include at least:

Vehicles Position Report

This message is sent by the current report receiver upon receiving a position report about a vehicle from MSGXFR process.

Vehicles Alarm Report

This message is sent by the current report receiver upon receiving an alarm position report about a vehicle from MSGXFR process.

Messages from the fleet process to the current report receiver do not generally occur. That is, current report receiver and the fleet process often interact in a single direction, which is not bi-directional.

The current report receiver interacts with the MSGXFR using a variety of messages. The messages from MSGXFR to current report receiver include at least:

Mobile Position Report(s)

This message is sent by the MSGXFR process when it is notified about the arrival of a new report from a vehicle. When the data arrive, the current report receiver checks to see if the vehicle for which data have been obtained is being tracked or not. If not, the message is discarded, alternatively, the type of the message is determined by reading the value of status variable from the message packet. Depending upon the type, the message is then converted to either Vehicle Position Report or Vehicle Alarm Report and sent over to the fleet process.

This message packet may contain one or more position reports. The current report receiver sends only the latest position report to the fleet process. However, if the mobile position reports contain alarm status reports, then the latest Vehicle Position Report and Vehicle Alarm Report are sent to the fleet process.

The messages from current report receiver to MSGXFR include at least:

Register Client

This message is sent by the current report receiver to register itself as a receiver process with the MSGXFR server. This is the first message sent by the current report receiver after establishing the connection with MSGXFR.

Disconnect Client

This message is sent by the current report receiver to indicate that the MSGXFR process should not send any further messages to the current report receiver process.

The current report receiver also interacts with the MPM. These interactions can be described as signals from the MPM to the current report receiver and signals from the current report receiver to the MPM. The signals from the MPM to the current report receiver are defined to include at least the following:

SIGTERM

This signal is sent by MPM to instruct current report receiver process to exit. Upon receiving this signal current report receiver will send the Close Connection Message to MSGXFR process, perform the necessary cleanup (i.e, release any allocated memory etc.) and exit with a normal status.

SIGHUP

This signal is sent by MPM when a new vehicle is added to the vehicles file. Upon receiving this signal the current report receiver rereads the vehicles file to update the list of vehicles being tracked.

SIGUSR1

This signal can be used to change the debug level for the printing debug messages in lesser or greater detail. Every time this signal is received, the current report receiver increases the debug level. If already at the highest debug level the signal changes the debug level to the lowest.

Signals from current report receiver to MPM can be defined as at least follows:

The current report receiver does not generally send any signals directly to the MPM. However, a SIGCLD signal is received by the MPM whenever the current report receiver exits. The exit status of the current report receiver process is notified to MPM along with the SIGCLD signal. Current report receiver hence communicates with MPM via its exit status. Shown below in the Table 2 is the list of exit status, which can be used by the current report receiver:

TABLE 2

List of exit status

| Exit Status | Type | Description |
|---|---|---|
| OK | Normal | CRR exited upon receiving SIGTERM |
| LOST CONNECTION | Abnormal | Could not restore connection to MSGXFR |
| SYSTEM ERROR | Abnormal | Other system fatal error |

Some embodiments provide for connection recovery. The current report receiver process is connected to MSGXFR via socket. If the socket connection fails, the current report receiver attempts to restore the connection for ‘n’ times waiting for ‘m’ seconds between successive attempts. If the connection cannot be restored, it exits with a LOSTCONNECTION exit status.

If the current report receiver loses connection to the geocoder, it attempts to restore the connection ‘n’ times waiting at least for ‘m’ seconds between each attempt. If the connection cannot be restored, it sends vehicle position reports to the fleet process without geocoding.

Of course, other functions can be performed by the current report receiver. These functions would be readily apparent to those of ordinary skill in the art. Accordingly, the above description should not limit the scope of the claims herein.

C. History Report Receiver

Figure 9:
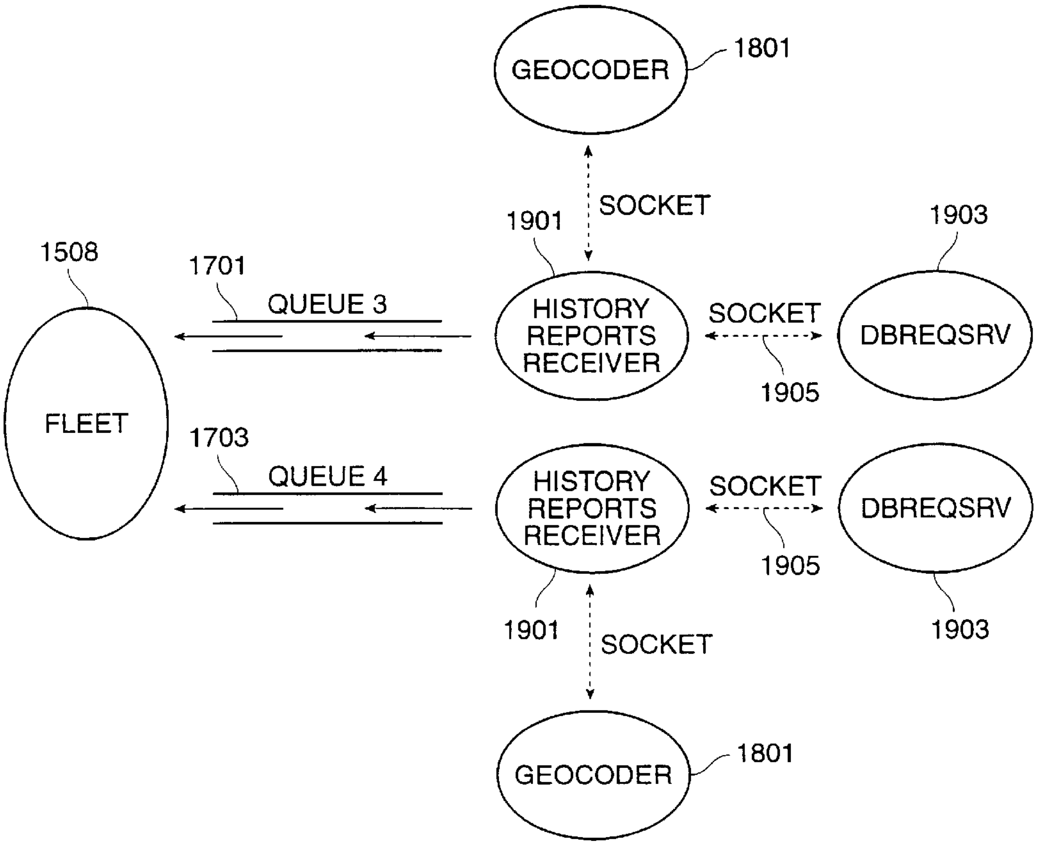
FIG. 9 is a simplified flow diagram of a fleet process according to still a further embodiment of the present invention.

This process transfers historical vehicle position reports from the MIC to the fleet process. For every history request, a new history report receiver process is started by the MPM. This process 1901 receives messages from the DBREQSRV process 1903, geocodes 1801 the vehicle position reports, and transfers them to the fleet process 1508, as shown by FIG. 9. The communication channels (e.g., sockets 1905 and queues) between these processes are shown.

The history report receiver process assumes that the queues and the socket communication channels exist at the time of its creation. (This is taken care of by the MPM) The identifiers for the queues and the socket is passed to the history report receiver by the MPM as command line arguments. The command line arguments in code can be:

<WindowId> <qid> <sockfd> <vehicleId> <startTime> <endTime > where

WindowId Id of the fleet map window requesting the history data;

qid Id of the queue connecting to the fleet process, which is used for sending data;

sockfd Socket descriptor connecting to DBREQSRV to collect history data;

vehicleId Vehicle for which history data is required;

startTime/endTime Time period for which history data is required;

MaxHistcount Maximum number of history reports that can be sent to the fleet process.

Upon start-up the history report receiver process performs at least the following: associates to the given queue id to send history reports to the fleet process; and connects as client to the geocoder. The address (e.g., hostname, port, etc.) of the geocoder is read from the system configuration file.

The history report receiver process then sends the request to collect history data and waits for data to arrive over the socket from the DBREQSRV process. DBREQSRV generally sends all the history reports in one message packet. History reports receiver, in turn, sends one report at a time to the fleet process. The history report receiver blocks on queue to send a history data. That is, if there is no room in the queue to insert a history report, it waits until the fleet process creates some room by reading a history report.

The history report receiver ensures that the number of history reports sent to the fleet process does not exceed MaxHistCount (Received from Command Line Parameter). After transferring all the history related data, the history report receiver process notifies the fleet process by sending the RCV_END_HIST message, closes the socket and then exits. (The responsibility of deleting the queue lies with the MPM). Transfer of history data can be aborted by sending a SIGTERM signal to this process. The signal is sent by MPM when the end user wishes to abort the history request.

The history report receiver has various interactions with the fleet process. These interactions include messages from history report receiver to the fleet process; and messages from the fleet process to history report receiver. Some of the messages from history report receiver to the fleet process are defined as follows.

History Report

This message is sent by history report receiver upon receiving data from DBREQSRV.

End History

This message is sent when there are no more history reports to be sent or upon receipt of a SIGTERM signal from the MPM. After sending this message, the history report receiver exits.

Messages from the fleet process to history report receiver are not generally read by the history report receiver. Of course, in some cases, it may be possible for the history report receiver to take messages from the fleet process, depending upon the application.

In some embodiments, the history report receiver interacts with the DBREQSRV process. For instance, some of the messages from history report receiver to DBREQSRV can be defined as follows:

Vehicle Time Data Request

This message is used by history report receiver to query the sequence number corresponding to a specific time. History reports receiver uses this message to query the starting and ending sequence numbers of historical data needed for the given time period. These sequence numbers are then used to request actual data from DBREQSRV.

Vehicle Data Request

This message is used by history report receiver to request the data for a given sequence number(s).

Close Connection

This message is sent by the history report receiver before closing the socket endpoint to which it is connected. No more messages are sent to DBREQSRV after sending this message.

In still further embodiments, the history report receiver receives messages from the DBREQSRV. In particular, some of these messages from DBREQSRV to history report receiver can be defined as follows:

Vehicle Time Data Response

This message is received by history report receiver in response to Vehicle Time Data Request. The message packet contains the sequence number of the vehicle data corresponding to the specified time.

Vehicle Data Response

This message is sent by DBREQSRV in response to Vehicle Data Request. The message packet contains the historical data requested by history report receiver.

Interaction can also occur with the MPM via signals from the MPM to history report receiver. For instance, some of these signals can be defined as follows.

SIGTERM

This signal is sent by MPM to instruct the history report receiver process to exit. Upon receiving this signal, the history report receiver performs the functions including: send the Close Connection Message to DBREQSRV; send End History Message to the fleet process; and exit with a normal status.

SIGUSR1

This signal can be used to change the debug level for printing debug messages in lesser or greater detail. Every time this signal is received, the history report receiver increases the debug level. If the debug level is already at the highest debug level, the signal changes the debug level to the lowest.

Signals from the history report receiver to the MPM are generally not provided. In particular, the history report receiver does not send any signals directly to MPM. A SIGCLD signal, however, is received by the MPM, whenever the history report receiver exits. The exit status of the history report receiver process is notified to the MPM along with the SIGCLD signal. History Reports Receiver hence communicates with the MPM via its exit status. As merely an example, a list of exit status which can be used by the history report receiver are provided in the Table 3 as follows:

TABLE 3

Exit status used by the history report receiver

| Exit Status | Type | Description |
|---|---|---|
| OK | Normal | End of history data or received SIGTERM |
| LOST CONNECTION | Abnormal | Lost connection to DBREQSRV |
| SYSTEMERROR | Abnormal | Other system fatal error |

In some embodiments, the history report receiver provides selected connection recovery features. However, the history report receiver process does not generally make any attempts to restore broken socket connections to DBREQSRV. If the socket connection to DBREQSRV breaks, it exits with a LOSTCONNECTION status. If the socket connection to the geocoder breaks, it sends the data to the fleet process without geocoding it.

Of course, other functions can be performed by the history report receiver. These functions would be readily apparent to those of ordinary skill in the art. Accordingly, the above description should not limit the scope of the claims herein.

D. MSGXFR Process

Figure 10:
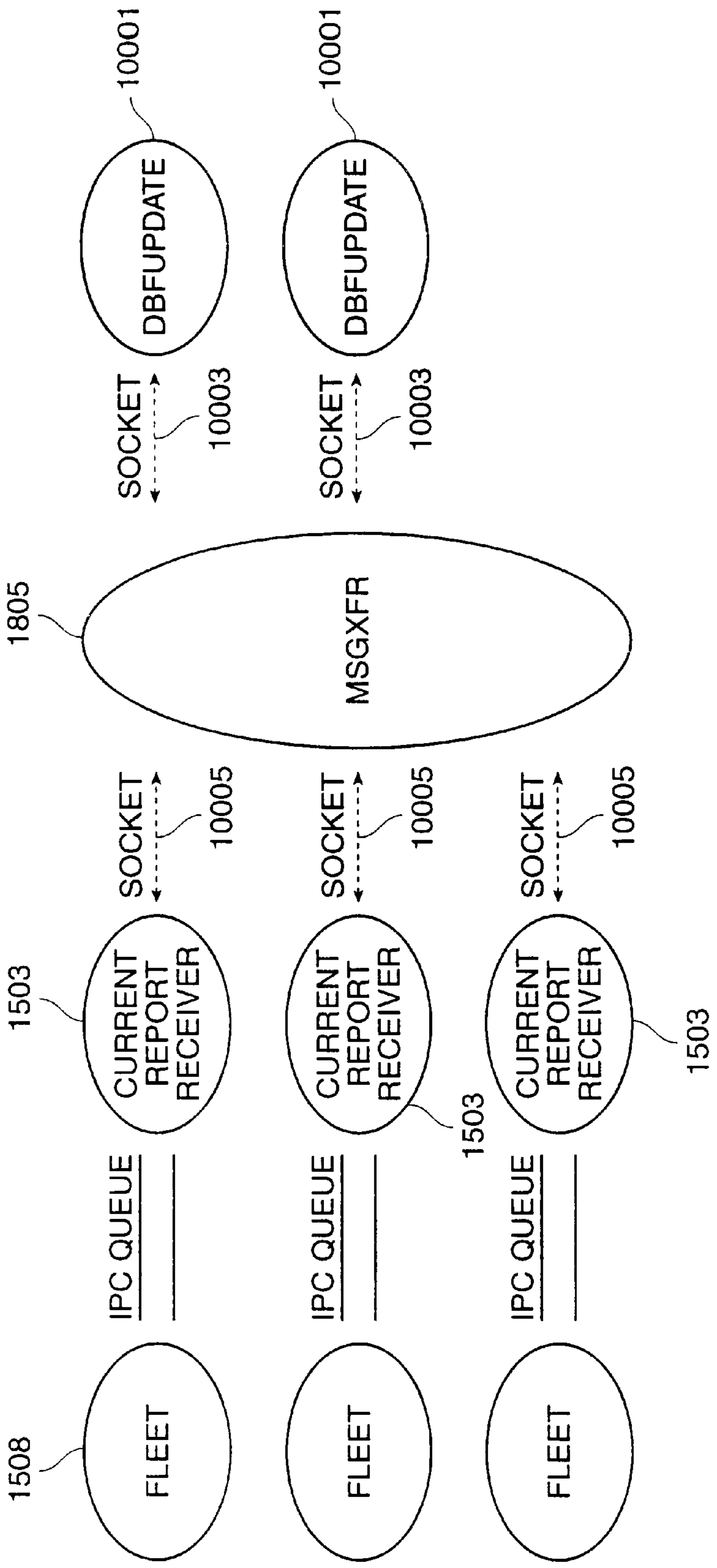
FIG. 10 is a simplified flow diagram of a fleet process according to yet another embodiment of the present invention.

This process receives messages from one or more DBFUPDATE processes 10001 and transfers them to the current report receiver(s) 1503, as shown by FIG. 10. In particular, MSGXFR is a server process which transfers messages between its clients (e.g., DBFUPDATE and current report receiver). MSGXFR is a connection-oriented iterative server process, i.e., one instance of MSGXFR handles requests from multiple clients, as illustrated by FIG. 10. Also shown are socket connections 10003, 10005, etc.

FIG. 10 shows an example for three instances of the fleet process connected to the same MIC. Each fleet process can have one current report receiver. All the current report receivers receive vehicle data from the same MSGXFR process. The above example shows two DBFUPDATE processes-there may be more, all of them accessing data from one or more shared memory segments.

After a connection is established between the MSGXFR process and any of its clients, a client is required to send a message identifying itself either as a receiver or sender. Messages reaching MSGXFR from a sender clients are sent to all the receiving clients, e.g., in the above Figure, DBFUPDATE is a sender and the current report receivers are receivers. (However, a process cannot be a sender or receiver at the same time, as in that case, the sender process gets back the message it just sent to MSGXFR. This is implemented by not allowing a client process to change its type from 'sender' to 'receiver' or vice versa).

The MSGXFR process includes a variety of other features. For instance, the MSGXFR maintains a list of sender and receiver clients connected to it. MSGXFR waits asynchronously on all ports to which the sender clients are connected. Whenever data arrives in any of the ports, the MSGXFR cycles through all the ports connected to the receiver processes, and sends the just received data to each one of them.

MSGXFR interacts with the DBFUPDATE process. For instance, selected messages are transferred from the DBFUPDATE to MSGXFR processes. Some of these messages are as follows:

Register Client

This message is sent by DBFUPDATE to register itself as a sender process with the MSGXFR server. This is the first message to be sent by DBFUPDATE after establishing the connection with MSGXFR.

Mobile Report

This message contains the mobile data to be transferred to the receiver processes connected to the MSGXFR server. If there are no receiver processes currently connected to MSGXFR server, the message is discarded.

Disconnect Client

This message is sent by DBFUPDATE to indicate that MSGXFR process should not expect any more data from DBFUPDATE process. After receiving this message MSGXFR closes the socket connecting to DBFUPDATE.

In most embodiments, there are simply no messages transferred from MSGXFR to DBFUPDATE.

The MSGXFR process also interacts with the current report receiver. For instances, some of the messages transferred from MSFXFR to current report receiver can be defined as follows.

Current Vehicle Data

This message is generated by MSGXFR upon receiving a Mobile Report.

The Mobile Report message packet is translated into Current Vehicle Data message and then sent to all the receiver processes. Essentially, the translation requires the conversion of a mobile id to a vehicle id. The MSGXFR processes use the look up table services to perform this conversion.

Examples of messages from current report receiver to MSFXFR are defined as follows:

Register Client

This message is sent by current report receiver to register itself as a receiver process with the MSGXFR server. This is the first message to be sent by current report receiver after establishing the connection with MSGXFR Disconnect Client This message is sent by current report receiver to indicate that MSGXFR process should not send any further messages to this current report receiver process. After receiving this message, MSGXFR closes the socket connecting to current report receiver.

The MSGXFR also has features for connection recovery. The MSGXFR process, however, does not make any attempts to restore broken connections with it's clients. If a socket connection breaks, it simply stops receiving or sending data to or from that socket. It is often the responsibility of the clients (e.g., DBFUPDATE or current report receiver) to re-establish broken connections.

E. DBREOSRV Process

This is a server process running on the MIC host. This process provides services to other client processes to login and access the vehicle report database residing on the MIC host. DBREQSRV process can be any suitable server, which can provide a concurrent server process and other functions. These functions include user account verification, a list of vehicles being tracked by a user account, number of reports available for a vehicle, number of reports received in a selected time period, vehicle reports (e.g., actual data such as time, location, etc.), and interface to poll a vehicle for a position report, among others. In further embodiments, the DBREQSRV process receives CAD packets from SFDSP and transfers them to a client.

In some embodiments, position reports are received from vehicles (by MIP_RECV) and written into the shared memory. Information from shared memory is periodically written (by DBFUPDATE) to the disk database to prevent an overflow. DBREQSRV accesses both the shared memory and disk database to provide most of the above listed services. Commonly, DBREQSRV, DBFUPDATE, and MIP_RECV processes also need to access the shared memory and/or disk database for reading and/or writing data.

In preferred embodiments, semaphore locks can be used to synchronize the access needs of these processes. The semaphore locking services are provided by a different module and hence the implementation details of these services are hidden from DBREQSRV and other processes.

In selected embodiments, the DBREQSRV provides the following services and others including: Request New Channel; and Close Connection. These services are defined as follows.

Request New Channel

This service allows clients to open multiple channels to communicate to DBREQSRV. Each channel is serviced by an independent DBREQSRV process and hence can be capable of providing all the services. This feature can be used by a client to perform several activities in parallel. In one embodiment, only one channel per user is supported.

Upon receiving this message, DBREQSRV opens a new socket connection and forks a copy of itself to create a child DBREQSRV. The descriptor of the new socket passes as a command line argument to the child. The child DBREQSRV receives the socket descriptor from the parent and waits for a connection request to arrive over the received socket. Then, the parent DBREQSRV sends the port id of the newly created socket to the client. The client should use the received port id to connect to the child DBREQSRV. After establishing the connection to the child DBREQSRV, the client uses any of the above mentioned services to gather data.

Close Connection

This service is provided to let the clients inform DBREQSRV about the unused channels. Upon receiving this message, DBREQSRV closes the socket connection it is servicing and exits.

Locking Mechanism

DBREQSRV process uses a new set of APIs to lock the shared memory or database. DBREQSRV uses the srv_MbfReadLock() and srv_DbfReadLock() routines to lock the shared memory and the database, respectively.

Handling CAD Packets

DBREQSRV receives CAD packets from SFDSP and transfers them to the Midmain process. To accomplish this the client (e.g., Midmain) and DBREQSRV establish a separate socket connection.

The DBREQSRV also provides a licensing mechanism to validate a license on the system. This will prevent unauthorized use of the fleet management system The DBREQSRV also provides limited features for connection recovery. In particular, DBREQSRV will make no attempts to restore broken connections. Upon encountering such a situation DBREQSRV simply exits. It is the responsibility of the client processes to reestablish any broken connection. However, DBREQSRV ensures that any child DBREQSRV processes (created upon New Channel Request) continue to function normally. This can be accomplished by making each child run as a daemon process at the time of its creation.

F. DBFUPDATE Process

This is generally a server process running on the MIC host. This process reads vehicle position reports from the shared memory and writes them to a disk database. This server can be any suitable server for processing data to and from memory.

DBFUPDATE performs a variety of functions in this systems. DBFUPDATE commonly spends most of its time sleeping. It wakes up at selected intervals, preferably regular, and waits indefinitely to acquire a lock on the shared memory. After acquiring the lock, it reads the shared memory header for each vehicle to determine the presence of new positions reports from at least one of the vehicles. If a new report for a vehicle is found, it writes it to the disk database and updates the shared memory header. APIs provided by other modules are used by DBFUPDATE to lock both shared memory and disk database.

In other embodiments, the DBFUPDATE has additional responsibilities of delivering the vehicle position reports to MSGXFR server as they are received. Upon start-up, DBFUPDATE connects to MSGXFR and registers itself as a sender process.

MIC has DBFUPDATE use a single semaphore lock per vehicle to store vehicle position reports. In other embodiments, multiple locks are used. To understand how DBFUPDATE delivers messages using multiple locks, let us consider a simple case where one lock is used to deliver position reports. As mentioned earlier, vehicle position reports are written to the shared memory by MIP_RECV. Arrival of new messages is notified to DBFUPDATE via a semaphore. DBFUPDATE sleeps on the semaphore value waiting for a message to arrive. Whenever a new message is written to the shared memory, MIP_RECV sets the semaphore and hence wakes up DBFUPDATE. Upon waking up DBFUPDATE reads the new message and writes it to the socket connecting to MSGXFR.

The message delivery mechanism using multiple locks is similar to the single lock process. Whenever a new message is received from a vehicle, MIP_RECV sets the corresponding semaphore to indicate presence of new data. DBFUPDATE cycles through each semaphore and acquires the memory segment only if the semaphore value is set. The key difference is that DBFUPDATE does not block (i.e., sleep) on one semaphore waiting for data, as the single lock example. DBFUPDATE achieves this using the API's provided by locking services module for testing the semaphore value and acquiring the memory segment. The implementation details of these services can be hidden from DBFUPDATE.

DBFUPDATE flushes data from shared memory to disk on a time basis (i.e., every "n" seconds). Alternatively, DBFUPDATE can also write data from shared memory to disk based at a selected time or a message threshold, i.e., number of messages in shared memory. DBFUPDATE sets a timer to expire after 'n' secs before reading vehicle reports from the shared memory. The number of unwritten messages (i.e., messages in shared memory but not flushed to disk) are also kept track in each shared memory segment. Whenever MIP_RECV writes a new report to the shared memory, it increments this number by one. Whenever DBFUPDATE reads a report from memory, it checks if the number of unwritten messages has reached the threshold mark. If so, DBFUPDATE writes these messages to disk, sets the number of unwritten messages to zero, and restarts the timer. However, if the timer expires before the threshold is reached, DBFUPDATE flushes data from all the memory segments to the disk. Of course, DBFUPDATE can also be designed to operate in other modes, depending upon the application.

DBFUPDATE use changes with APIs provided by the locking services. The following table describes these locking services. DBFUPDATE acquires them using the given API's for accessing the shared memory and the database.

TABLE 4

Locking services

| Lock Type | Locked object | API to be used | Reason for acquiring lock |
|---|---|---|---|
| UPDATE_LOCK | Shared Memory | srv_MbfUpdateLock( ) | Reading data to be flushed |
| WRITE_LOCK | Database | srv_DbfWriteLock( ) | Write data to disk |
| REFRESH_LOCK | Shared Memory | srv_MbfRefreshLockNW( ) | Read new report |

DBFUPDATE also assists in recovering lost connections between various processes. If the connection between DBFUPDATE and MSGXFR breaks, it is detected when DBFUPDATE attempts to send a message to the MSGXFR process. At this point, DBFUPDATE sends a connection request to MSGXFR. If the connection cannot be established, it continues to poll the shared memory. The next attempt to reestablish the connection is made when a new message has to be delivered.

H. Shared Memory and Locks

Shared memory is used to store current vehicle reports and the like. The memory can be any suitable memory capable of storing the information to be stored. This memory can be in the form of a disk, tape, memory chip, and the like. Of course, the particular memory used depends upon the application.

The shared memory can be accessed by MIP_RECV, DBFUPDATE, and DBREQSRV. Descriptions for these processes were provided above. Other processes can also access the shared memory when necessary. Locks such as semaphore can be used to synchronize concurrent access attempts of these processes and others. A detailed discussion of these locks are provided below.

In an embodiment, vehicle reports are stored in shared memory. A set of API's is often provided to: lock and unlock the shared memory; and insert data into shared memory. In an embodiment, one lock can be provided for both read and write operations to the shared memory. That is, only one process accesses the shared memory at a selected time. The identification of the lock is stored in the header of the shared memory. An example of a shared memory format is provided below in the Table 5.

TABLE 5

| Shared Memory Header Information<br>Shared Memory Header | | | |
|---|---|---|---|
| Vehicle Header 1 | Report 1 | Report 2 | |
| Vehicle Header 2 | Report 1 | Report 2 | Report 3 |
| Vehicle Header 3 | | | |
| Vehicle Header 4 | Report 1 | Report 2 | Report 3 |

As shown, a position report (e.g., Report 1, Report 2, Report 3, etc.) is received from a vehicle. It is kept in a buffer, typically a fixed size cyclic buffer such as those depicted by Table 5. When all the space in the buffer is used up, old reports are overwritten to accommodate new reports. At least one such buffer is maintained for each vehicle, e.g., vehicle 1, vehicle 2, vehicle 3, etc.

A vehicle data header (e.g., Vehicle Header 1, Vehicle Header 2, Vehicle Header 3, Vehicle Header 4, etc.) is also maintained for each vehicle. Each vehicle data header contains miscellaneous control information about the vehicle plus the index of the newest and oldest report in the buffer. The number of vehicles and the size of the cyclic buffer are also kept in the shared memory header.

In preferred embodiments, the shared memory structure can be changed so that position reports from different vehicles can be written simultaneously to the shared memory. This is often achieved by locking only the vehicle data buffer and header in which the report is being written. To accomplish this, one lock per vehicle will be defined. Key values for each lock are stored in the shared memory header or any other desirable location. The data structures defining the shared memory can be provided by the computer code below:

```
typedef struct {
long numunits;
long numinfo;
key_t keyTable[];
}ShmHeader;
```

The below code structure defines the data header for each vehicle. As mentioned earlier one data header is used per vehicle.

```
typedef {
Mobileld mid;/* Mobile Id */
short refcnt;
long old; /* Index of oldest info into cyclic buffer. */
long new; /* Index of newest info into cyclic buffer */
long threshhold; /* High water mark to flush data */
long flushedSeq; /* Last sequence flushed to disk*/
long deliveredSeq; /* Last sequence read and delivered*/
long timeout; /* TimeOut counter */
short flags; /Status flags */
short numports; /* Total comm ports */
short port[MODEM_PORTS]; /* Port numbers*/
short rep_freq; /* Reporting Frequency */
long cur_status; /* Current status of unit */
long last_port; /* Last port unit communicated on /
long last_seq; /* Last tracking num. For duplicate detection */
long last_prio_seq; /* Last tracking number. For duplicate detection of high priority packets */
}ShmVehDataHeader;
```

This data structure is used to store the actual data received from the vehicle. A fixed size array of this data structure is created and used as a cyclic buffer to hold the vehicle reports. Each report for a vehicle is uniquely identified by the 'seq' member of the data structure.

In a preferred embodiment, semaphore locks for each vehicle can be used to synchronize access of shared memory. For instance, four member semaphore locks represent the following information:

Number of readers

This is the number of processes accessing the shared memory for read only purpose.

Number of writers

This is the number of processes accessing the shared memory for writing vehicle data and/or updating vehicle header.

New message count

This is the number of new messages written by the writer or in other words count of undelivered messages.

Number of updaters

This is the number of processes accessing the shared memory for update purposes. These processes read vehicle data but update the vehicle data headers and hence are differentiated from writers.

This four member semaphore can be used to implement the following locks.

WRITE_LOCK:

Processes (e.g. MIP_RECV) wishing to write vehicle data into shared memory acquires this lock. This lock request can succeed if no other process is accessing the shared memory. In other words, the lock request succeeds if the following condition can be satisfied:

Writers=0
Readers=0
Updaters=0

Once this lock is acquired no other lock can be acquired until the release of this lock.

READ_LOCK

Processes wishing to access the vehicle data for read only purposes must acquire this lock. This lock request will be honored if the following condition is satisfied Writers=0

This lock prevents subsequent WRITE_LOCK requests to be honored. A UPDATE_LOCK or REFRESH LOCK request can still be honored while a process is reading the shared memory.

This lock is typically used by the DBREQSRV process.

UPDATE_LOCK

This lock must be acquired by the processes wishing to read vehicle data and/or update the vehicle data header. However, a process must not modify the old and new members of the vehicle data header. This is so because a modification in these values are used by the readers to access the vehicle data. The lock request can be satisfied if the following conditions are satisfied:

Writers=0
Updaters=0

While a process has acquired a UPDATE_LOCK, other processes can acquire the READ_LOCK only. This lock is typically acquired by the DBFUPDATE process to write data to the disk.

REFRESH_LOCK

The REFRESH_LOCK is similar to the UPDATE_LOCK with at least one exception. This lock adds an additional constraint for presence of a new message. The lock request can be honored if the following conditions are satisfied:

Writers=0

Updaters=0

New message count>0

In preferred embodiments, a set of APIs provides a locking services module to acquire and release the above mentioned locks. Both blocking and non-blocking versions of the API's are provided. In blocking versions, each of these routines blocks until the requested lock is acquired or an error condition is encountered. If the lock is acquired successfully, a value 1 is returned else a −1 is returned. A UNIX global variable errno or other process may be used be determine the nature of the error.

In non-blocking versions, if a lock cannot be acquired the call does not block the caller, the API routine returns immediately. These APIs return with a value of 0, 1, or −1. A return value of 0 indicates that the lock cannot be acquired without blocking the caller. A return value of 1 denotes that the requested lock has been acquired successfully. Finally, a return value of −1 indicates that a system error was encountered. A UNIX global variable errno or other process can be examined to determine the reason for error.

Once a lock has been acquired, the corresponding unlock API should be called to release the lock. These can be performed by the routines shown below in computer code.

```
int srv__MbfWriteUnlock(VehicleId unit)
int srv__MbfReadUnlock(VehicleId unit)
int srv__MbfUpdateUnlock(VehicleId unit)
int srv__MbJRefreshUnlock(VehicleId unit)
```

The above routines return either 1 or −1 to indicate successful release or an error condition respectively.

L. Disk Database and Locks

The disk database provides memory for reports received from vehicles. Any suitable disk database (or other database type) can be used for storing reports into memory. The amount of memory should be suitable to meet the requirements of the particular application. This database can be accessed through servers such as those processes defined by DBFUPDATE and DBREQSRV. In some embodiments, semaphore locks are used to synchronize the database access of these processes.

In a specific embodiment, a single semaphore lock is used to synchronize the access to the database. Accordingly, only one process can access the database at a selected time. The semaphore lock works at the database level and not the vehicle level. That is, while one process is writing data pertaining to a vehicle, other processes wanted to access the rest of the database wait for the prior process to finish. Of course, other modes of application can run where multiple users can access the database simultaneously.

In most embodiments, the database is a fixed file size. The size of the file can be determined at the time of installation. Preferably, the database is formatted to store a maximum number of reports for each vehicle. The format of the database is similar to the shared memory format and can be provided as shown below in Table 6.

TABLE 6

| Database Header Information<br>Database Header | | | |
|---|---|---|---|
| Vehicle Header 1 | Report 1 | Report 2 | |
| Vehicle Header 2 | Report 1 | Report 2 | Report 3 |
| Vehicle Header 3 | | | |
| Vehicle Header 4 | Report 1 | Report 2 | Report 3 |

As shown in Table 6, the database header contains the following information including: identification of the lock semaphore being used to lock the database; number of buffers (i.e., maximum number of vehicles); and size of buffer (i.e., maximum number of reports for each vehicle). The information (or data) about each vehicle and number of valid reports for that vehicle are stored in the vehicle header, e.g., Vehicle Header 1, Vehicle Header 2, Vehicle Header 3, Vehicle Header 4, etc. The actual reports (e.g., Report 1, Report 2, Report 3, etc.) are stored in the buffer following the vehicle header.

In other embodiments, the database structure can be changed to implement locking at the vehicle level. This allows portions of database to be accessed simultaneously by different processes. This can be achieved by defining a separate lock for each vehicle. The key for each lock can be stored in the header of the database and other locations. The data structures defining the database format are described below in computer code. This following code defines the database header.

```
typedef struct {
long numunits;
long numinfo;
key__t keyTable[];
}DbHeader;
```

The below DbVehDataHeader structure defines the data header for each vehicle. As mentioned earlier, one data header is used per vehicle.

```
typedef {
MobileId mid; /* Mobile Id */
short refcnt;
long old; /* Index of oldest info into buffer. */
long old__time; /* Time of oldest info */
long old__seq; /* Sequence number of oldest info */
long new; /* Index of newest info into buffer. */
long new__time; /* Time of newest info */
long new__seq; /* Sequence number of newest info */
short flags; /Status flags */
}DbVehDataHeader;
```

The below DbVehReport data structure can be used to store the actual data received from the vehicle. A fixed size array of this data structure is created and used as a cyclic buffer to hold the vehicle reports. Each report for a vehicle is uniquely identified by the 'seq' member of this data structure, which allows for easy identification of the vehicle information in the data structure.

```
typedef DbVehReport MobileInfo;
```

In preferred embodiments, semaphore locks can be used for each vehicle to synchronize access of database. For instance, two members of the semaphore locks represent the following information.

Number of readers

This is the number of processes reading the database.

Number of writers

This is the number of processes writing to the database.

In some embodiments, the semaphore is used to implement the following locks:

WRITE_LOCK:

Processes (e.g. DBFUPDATE) wishing to write vehicle data to the database must acquire this lock. This lock request can only succeed if no other process is accessing the database. The lock request succeeds if the following conditions are satisfied:

Writers=0

Readers=0

Once this lock is acquired, no other lock can be acquired until the release of this lock.

READ_LOCK

Processes wishing to read vehicle data for read only purposes must acquire this lock. This lock request will be honored if the following condition can be satisfied: Writers=0.

The READ_LOCK prevents subsequent WRITE_LOCK requests to be honored. That is, while a process is reading data, more or other processes can share the database to read data but no process is allowed to write to the database. The READ_LOCK is typically used by the DBREQSRV process.

In other embodiments, APIs are provided by the locking services module to acquire and release the above mentioned locks. Both blocking and non-blocking versions of the APIs are provided. In the blocking versions, each of the routines blocks until the requested lock is acquired or an error condition is encountered. If the lock is acquired successfully, a value 1 is returned, otherwise a −1 is returned. A UNIX global variable errno may be used be determine the nature of the error. Other processes can also be used to determine the nature of the error.

In the non-blocking version of the above APIs, when called if a lock cannot be acquired the call does not block the caller and the API routine returns immediately. These APIs return with a value of 0 or 1 or −1. A return value of 0 indicates that the lock cannot be acquired without blocking the caller. A return value of 1 denotes that the requested lock has been acquired successfully. Finally, a return value of −1 indicates that a system error was encountered. A UNIX global variable errno or other process can be examined to determine the reason for error.

Once a lock has been acquired, the corresponding unlock API should be called to release the lock. Routines are used to return either 1 or −1 to indicate successful release or an error condition respectively.

H. Geocoder

Geocoder is a server process, which can provide forward and reverse geocoding services to its clients. The term geocode is generally defined as converting a street address into a latitude/longitude designation, or converting a latitude/longitude designation into a street address. Of course, other definitions can be used depending upon the application.

In one embodiment, the geocoder can be a wrapper over a conventional geocode library. An example of this library is one sold by Etak of Menlo Park, Calif. called Etak GeoCode Library. But other libraries can be used, depending upon the application. Geocoder generally accepts geocoding requests from clients over a network such as TCP/IP and others, and hands them over to the geocode library. The geocode library processes (i.e., geocodes) the received data and passes the result to the geocoder. The geocoder bundles the results into a message packet and sends them to its client.

Geocoder can run as a daemon UNIX process and waits for a connection request on a known port. Upon receiving a connection request, the geocoder forks a new child process to serve the geocoding requests. Geocoder also runs in a variety of modes, including intelligent mode and dumb mode.

These two modes can define the manner in which the geocoder interacts with the geocode library. The geocode library geocodes an address based on typical search strategies to define a latitude/longitude designation. Depending upon the search strategy and the given address, differing results can be yielded.

For instance, in intelligent mode, if a location cannot be geocoded or multiple matches are found, the geocoder selects a different search strategy and retries to geocode the given location, which is defmed by a latitude/longitude value. In this mode, the number of matches returned to the client for a given location is always less than or equal to 1. If a geocoded address cannot be found, then the geocoder gives a zero.

In dumb mode, for instance, the responsibility of choosing a search strategy lies with the client. The client selects a search strategy and sends a geocoding request to the geocoder.

In these modes and others, interactions with the client occur using fixed length message packets. Each message has a fixed length header and contains the type and length of the message. Among others, the following messages can be exchanged between the geocoder and the clients:

Switch Mode

This message is sent by the client to indicate the mode of operation (i.e., intelligent or dumb) to be used by the geocoder. The mode is used for subsequent geocoding requests and does not generally affect the geocoding request.

Forward Geocode

This message is sent by client to request the conversion of the selected address to a latitude/longitude (lat/lon) designation. Upon receiving this message, the geocoder initiates the geocoding process and sends the status back to the client. The resulting geocoded data are sent only upon receiving the Fetch Geocoded Data request from the client.

Reverse Geocode

This message is sent by client to request the conversion of the given lat/lon and the street name to a complete address. Geocoder performs the geocoding upon receiving this request and sends the status back to the client. Clients request the data by sending a Fetch Geocoded Data message to the geocoder.

Fetch Geocoded Data

This message is sent by the client to request the geocoded data for the last geocoding request. This message also contains the range of matches that should be sent to the client. Clients can receive all the data once or in multiple chunks using this message.

Geocoded Data

This message is sent by the geocoder in response to Fetch Geocoded Data. One Geocoded Data message per match is sent to the client. The number of packets sent is normally equal to the number of matches requested. The last Geocoded data message for one fetch request has its lastMatch flag set in the message.

Error Message

If a client request cannot be honored, this message is sent to the client to indicate the reason for dishonoring the last request. For example, if an error is encountered in the geocoding process, this message is sent to the client explaining the reason for failure.

Success Message

This message is sent by the geocoder in response to a geocoding (e.g., forward or reverse) request. This message indicates that the geocoding process was performed successfully. Success Message contains the number of matches found for the last geocoding request. A count of zero matches (i.e., no matches) is not treated as an error and should be handled by the client.

Close Connection

This message is sent by the client at the end of the session. Upon receiving this message, the child geocoder servicing the client closes the socket and exits.

The above embodiments used for the fleet management system are merely examples. Other variations, modifications, and alternatives can be used. Accordingly, the above description to the embodiments should not limit the scope of the claims, as defined herein.

COMPUTER AIDED DISPATCHING TECHNIQUES

Figure 11:
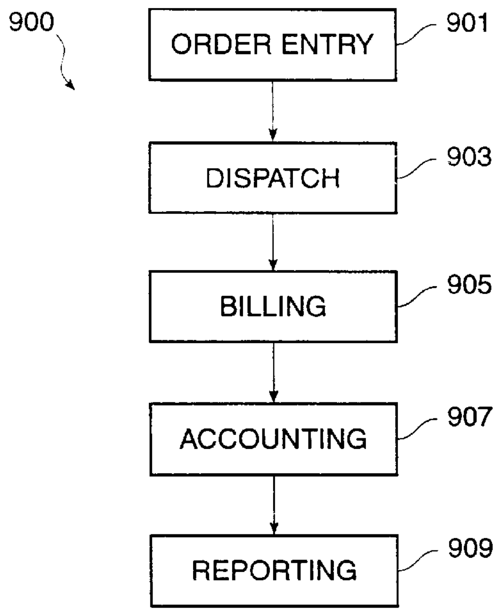
FIG. 11 is a simplified order entry screen according to the present invention.

The computer aided dispatch (CAD) system can be any suitable computer aided dispatch method and apparatus according to the present invention. The computer aided dispatch system can be programmed via software in a suitable language, such as C, C++, Fortran, etc., into a system including a computer and sufficient memory to handle data from orders. An example of a computer aided dispatch system was sold by an ADAQ Systems Corporation. A simplified flow diagram of a computer aided dispatch method is illustrated by FIG. 11. The computer aided dispatch system 900 includes at least steps of order entry 901, dispatch 903, billing 905, accounting 907, reporting 909, and others. Each step may comprise a separate software package performing the described functionality. CAD system may thus be implemented by mixing and matching packages from different vendors. For example, any stand alone dispatching system, scheduling system, business management system, etc. can be integrated into the CAD. Further, it would be recognized by one of ordinary skill in the art that other steps and software packages can also be incorporated into a computer aided dispatch system depending upon the particular application.

The step of order entry 901 captures order information for processing an order at the time of an order. The order often comes in by way of a phone call, an e-mail, a phone mail, postal mail, or the like to the computer aided dispatch system. The order information includes elements such as a caller (or company), a phone number (or e-mail number), billing data, origin data, destination data, and other data. The billing data often include a billing name, an address, an authorization number, and the like. Origin data include information with regard to pick-up (or origin) such as a contact name, pickup address, and the like. The destination data include a contact name, destination address, and the like. Of course, other forms of data may also be captured depending upon the particular application.

Optionally, the order entry step occurs automatically or semi-automatically or the like. For example, the order entry step may include a caller identification features such that the caller's name and number automatically download into the computer aided dispatch system memory. The caller can also use a touch tone feature of a conventional phone to input a pick-up location and delivery location. The caller may select a particular location by depressing a unique input number, alphanumeric character, or combination thereof, or the like corresponding to the location. The computer aided dispatch system automatically inputs such caller identification, pick-up location, and delivery location features into memory.

Figure 12:
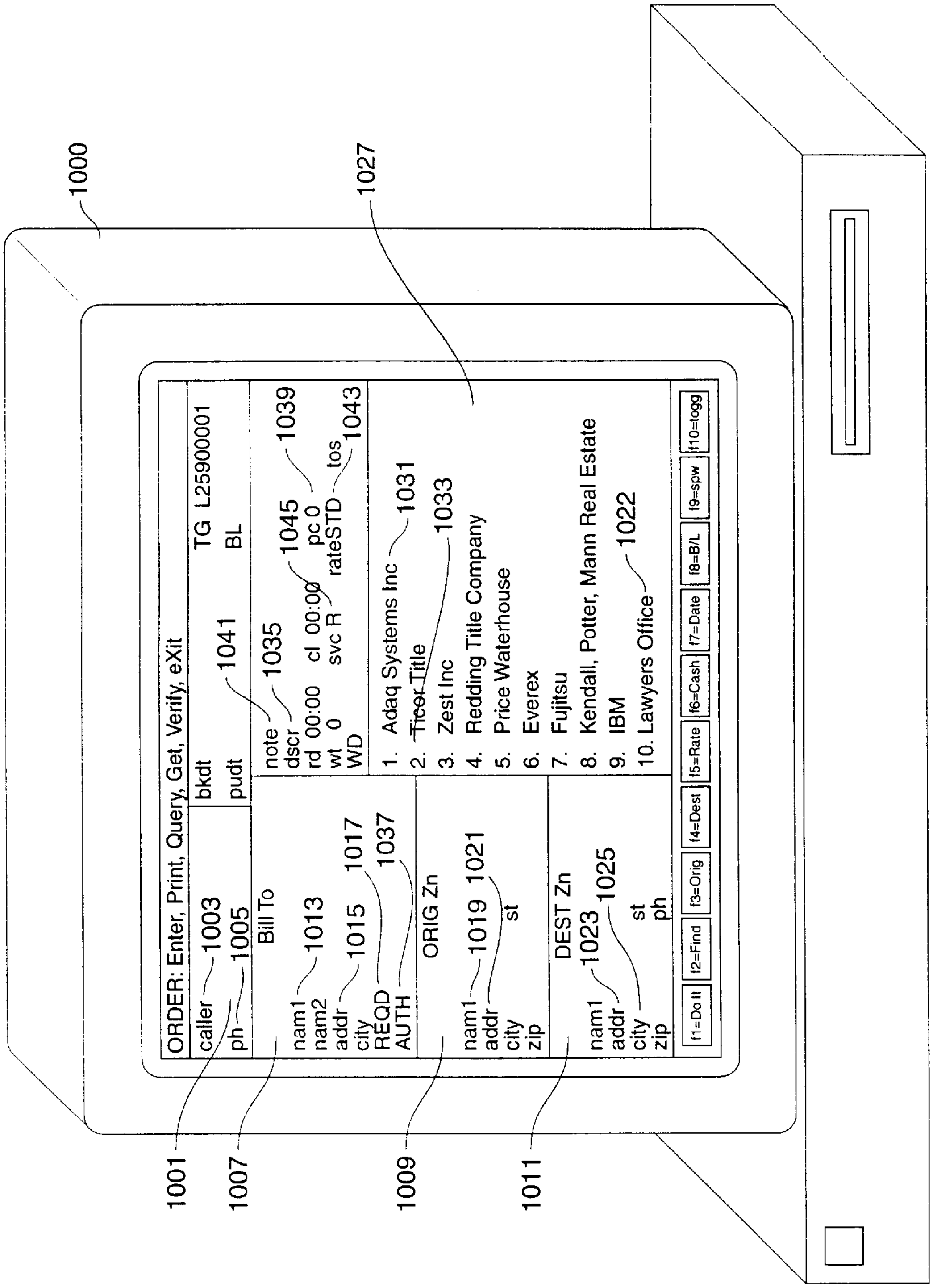
FIG. 12 is a simplified dispatch screen of the system according to the present invention.

A simplified example of an order entry screen 1000 for order entry 901 is illustrated by FIG. 12. The order entry screen can be on any suitable computer or dumb terminal at, for example, a dispatch station or the like or a customer location. The order entry screen in the example provides a snap-shot of a customer account. The order entry screen divides into a plurality of regions (or multiple screens), each having data for a selected input. A user may access each section by way of an input device such as function keys f1, f2, f3 . . . fn, and others, hot keys or the like, a mouse in, for example, a Windows™ environment, or the like. The order entry screen includes a screen portion for caller information 1001 such as a caller field 1003 and a phone number field 1005. The order entry screen also includes screen portions for billing data 1007, origin data 1009, destination data 1011. The billing data 1007 include fields for a billing name 1013, an address 1015, and an authorization number 1017. The origin data 1009 include fields for a contact name 1019 and an address 1021. The destination data include fields for a contact name 1023 and a destination 1025.

Optionally, the order screen can also include a screen portion 1027 identifying common delivery points for each account. The delivery points are listed by, for example, company 1031 and corresponding number 1033. Information such as an address, a contact person, route information and the like, is stored in memory for each company. In a preferred embodiment, a customer accesses the computer aided dispatch system via phone and inputs the delivery and origin data by way of the corresponding number. Alternatively, the user specifies the delivery points for the customer via input device at the dispatch station. As the customer adds additional delivery points, the information is automatically added to the customer account information and stored into memory for later use. Of course, other information can also be displayed on the screen, as well as other techniques for accessing and entering the delivery points.

On the order entry screen, the customer account can also include data such as payment delinquency information 1035, authorization information 1037, customer rate information 1039, customer notes 1041, and other information. The payment delinquency information can be shown on the screen by an indicator such as a flashing "HOLD" indicator or the like. A payment delinquency also places a hold on the account to prevent the user from taking the order from the customer. The user may, for example, release the hold on the account and take the order for the customer and inform the customer of such payment delinquency. Alternatively, a user can refuse to take the order from the customer until payment. If the customer account is seriously delinquent, that is, past a selected number of days such as more than 60 days, more than 90 days, more than 120 days or the like, a second level hold can be placed onto the account. A second level authorization with a selected password can bypass the second hold level to allow the user to the take the order from the customer. Alternatively, the user can refuse to take the order from the customer until payment. Of course, the present system can be tailored to include a selected amount of authorization steps and indications depending upon the application.

Certain customers require the use of authorization information to be provided to the user before the user takes the order from the customer. The authorization information may include, for example, a reference number, a department name, an invoice number, or other information.

As previously noted, the order screen also includes customer rate information 1039 and customer notes 1041, among other information. The customer rate information 1039 includes fields for rates 1043 and corresponding services 1045. The customer notes include any additional information as specified by the customer which are not defined in the other fields as previously described. Other information can include a ready time (if different from the call-in time), a required delivery time, pieces and weight, service type, vehicle type, other reference numbers. such as an air bill or the like, an on-screen price quote, and the like.

The dispatch step transfers 903 dispatch information from a dispatch screen, a dispatch ticket, or a combination of both to the dispatch location. The dispatch step transfers the dispatch information via a phone line, a wide area network, a local area network, a pager, or any other communication means available for the particular application. The dispatch information is sent to the dispatch directly, or at selected time prior to the ready time for pre-scheduled or daily jobs. The dispatch location can include multiple dispatch stations, a single dispatch station, or the fleet mobile unit itself. For example, the dispatch step transfers orders with a downtown address to the downtown dispatcher. Alternatively, the dispatch step transfers orders that require trucks to the truck dispatcher. Alternatively, the dispatch step sends the order to the driver directly via pager, radio unit, cellular telephone, or any other available communication means.

In an embodiment using the dispatch screen, the computer aided dispatch system updates the order record with time information such as a dispatch time, a pick-up time, and a delivery time as such times (or in real time). Accordingly, any user with access to the computer aided dispatch system can query a selected order and see the status of the order at a selected time without disturbing any other user.

Figure 13:
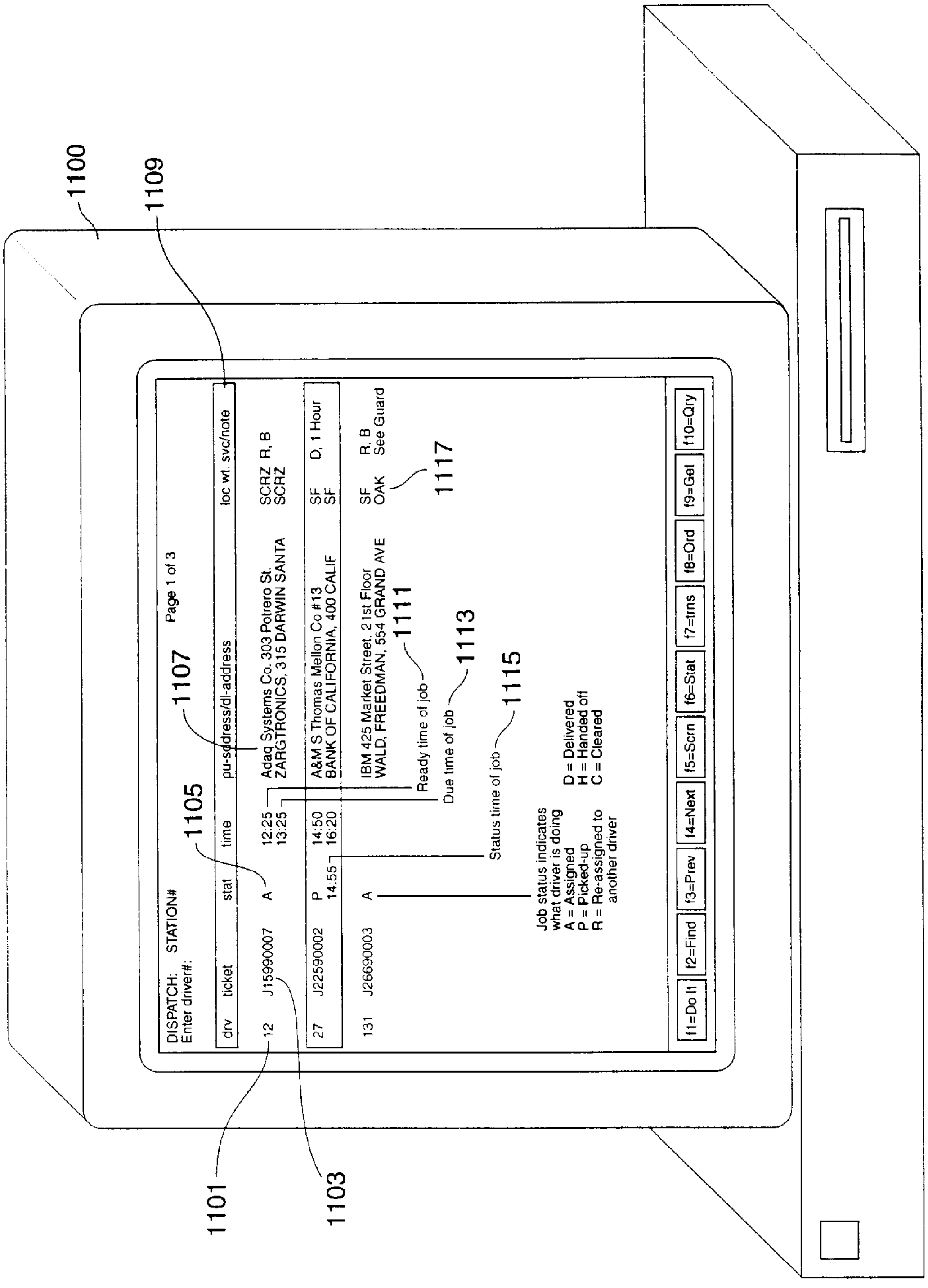
FIG. 13 is an alternative simplified dispatch screen of the system according to the present invention.

FIG. 13 is a simplified example of a dispatch screen 1100 according to the present invention. The dispatch screen is merely an example and should not limit the invention as described by the claims herein. The dispatch screen 1100 includes driver numbers 1101, ticket numbers 1103, status letters 1105, pickup addresses 1107, notes 1109, ready times 1111, due times 1113, a status time 1115, and other information. The status letter provides a selected letter corresponding to the driver as shown in Table 7.

TABLE 7

Status Letters and Descriptions

| STATUS LETTER | DESCRIPTION |
|---|---|
| A | Order Assigned to Driver |
| P | Order Picked up by Driver |
| R | Order Re-assigned to Another Driver |
| D | Order Delivered by Driver |
| H | Order Handed Off to Driver |
| C | Order Cleared by Driver |

As shown, Table 7 provides an example of status letters and corresponding descriptions. Of course, other types of letters or characters can also be used to designate selected statuses in other applications.

Optionally, the dispatch screen is in color for easy identification of selected orders and the like. For example a green highlight of an order indicates an order that requires a delivery time of one hour or less. A red highlight indicates an order with a delivery time of a half an hour or less. Once a selected cut-off time passes, the orders can remain in red, but flash continuously to indicate a missed order or the like. Of course, other color selections and indications can be used depending upon the particular application.

The computer aided dispatch system provides a billing 905 step according to the present invention. The billing step preferably occurs on the same day as the day the order is completed, or more preferably within hours of order completion. Alternatively, the billing occurs on a time schedule such as a weekly basis, a bi-weekly basis, a monthly basis, a quarterly basis, or any other time basis. The computer aided dispatch system automatically (or semiautomatically) outputs the billing information for the selected account at the selected time. The output occurs as, for example, a printout, a download from a direct on-line link to the customer premises, and the like.

The computer aided dispatch system also includes an accounting 907 step with corresponding accounting module or the like. The accounting step provides for cash posting methods, invoicing methods, and other methods of posting payment on a selected order. The accounting module provides credits and account balances to be retrieved by way of a key or any other input means. A credit caused by the driver of the fleet mobile unit may be charged back to the driver and then stored in a selected memory. The module may also calculate driver commissions with a key based upon rate data, delivery information, and the like. A hold status can be placed on a particular account when an account is overdue. Details with regard to a hold status were described in an aforementioned embodiment. The module also provides data from an accounts payable, a payroll, and a general ledger, among others.

A reporting 909 step is also included in the present method. The reporting step provides for reports from memory by way of a selected key. The reporting step includes reports such as sales reports, aging reports, service analysis reports, commission reports, customer activity reports, common caller reports, period processing reports, gross profit reports, revenue distribution reports, payment/adjustment reports, order entry count reports, zone distribution reports, summary exception reports, rate sheet printing reports, sales person reports, driver productivity reports, and others.

Figure 14:
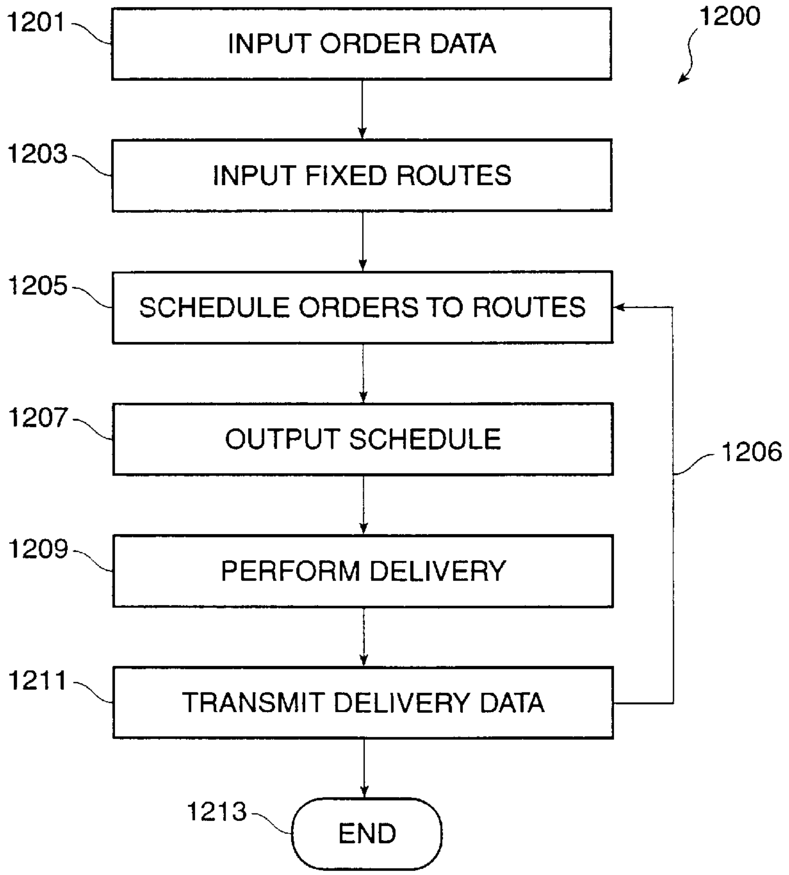
FIG. 14 is a simplified flow diagram of a schedule selection method according to the present invention.

FIG. 14 is a simplified flow diagram of a scheduling method 1200 according to the present invention. The scheduling method is performed on the computer aided dispatch system as previously described, but can also be performed on other computer aided dispatch systems and the like. The scheduling method 1200 includes steps such as input order data 1201, input fixed routes 1203, schedule orders to routes 1205, output schedule 1207, perform delivery 1209, transmit delivery data 1211, and reschedule orders to routes 1205 via branch 1206, and others.

In step 1201, order data are input into memory of the computer aided dispatch system. Order data include caller information such as a caller name, a phone number, and the like. Order data also include billing data, origin data, destination data, and others. The billing data include a billing name, a billing address, a billing authorization number, and other information. The origin data include at least a contact name and a contact address. The destination data include at least a contact name and a destination. Order data also include package size and others, time information and data constraints.

The fleet includes a selected number of fleet mobile units with fixed routes (or scheduled routes). A fleet mobile unit performs pick-up and delivery based upon its fixed route typically for efficiency purposes or the like. The scheduling method inputs the fixed routes for the fleet into memory of the computer aided dispatch system in step 1203. The input step occurs by way of standard input devices such as keys, or the like. Alternatively, the fixed route can be entered via the automatic vehicle location apparatus or the like.

In step 1205, the scheduling method via a processing means schedules the order data with a fixed route to provide schedule information. In particular, the scheduling method identifies pick-up and delivery points from the order data, and correlates such pick-up and delivery points to a fixed route. Additional order data such as time constraints, order size, and other information may also be used to determine which order should be placed to the particular fixed route. The scheduling method schedules each order with a fixed route based upon the order data. Criteria for such selection process includes increasing the amount of orders per fixed route such that the cost per order decreases, or the amount of time spent on each order per route decreases. Alternatively, a criteria for such selection process includes optimizing the route based upon the order data and fixed routes. Optimization is often defined as reducing the amount of time necessary between the pick-up and delivery of the order, and increasing the amount of profit for the fixed route or routes as a whole. The schedule information is stored into memory of the computer aided dispatch system, and the like. Of course, other selection criteria and optimization schemes may be used depending upon the particular application.

The scheduling method outputs the schedule information including the schedule with order and corresponding route in step 1207. In particular, the scheduling method retrieves from memory the schedule information and outputs such schedule information to an output device. The output device includes a device such as a line printer, a ticket from a line printer, a screen display, a pager, and others. The output device can be located at, for example, a dispatcher, a fleet mobile unit, or the like. The dispatcher forwards the schedule information to the selected fleet mobile unit with the fixed route. Alternatively, the fleet mobile unit receives the schedule information directly via output device or the like.

The fleet mobile unit performs the instructions on the schedule information for its scheduled orders in step 1209. Upon pick-up of the order the fleet mobile unit transmits (step 1211) pick-up information to the dispatch station or the like. The dispatch station receives the pick-up information and updates the computer aided dispatch system which reflects (or outputs) such changes on, for example, a display screen or the like. The fleet mobile unit periodically transmits time and location information to the computer aided dispatch system via automatic vehicle tracking system. Upon delivery of the order, the fleet mobile unit transmits delivery information to the dispatch station or the like. The dispatch station receives the delivery information and updates the computer aided dispatch system, which reflects such changes on for example memory and a display screen or the like.

By way of branch 1206, the scheduling method reschedules orders and reroutes the fleet mobile unit in step 1205. In particular, the scheduling method via processor reschedules the route and orders for the fleet mobile unit based upon additional information including the pick-up information, delivery information, and time and vehicle location information from step 1211. The re-scheduled information is output (step 1207), the re-scheduled orders are delivered (step 1209), and pick-up and delivery information are re-transmitted to the dispatch station via branch 1206.

Upon completion of the fixed route, the fleet mobile unit returns to homebase, and the scheduling method provides new schedule information to the fleet mobile unit. The fleet mobile unit traverses the fixed route based upon a time criteria such as a half day route, a daily route, a weekly route, or the like. The fleet mobile unit can also traverse the route based upon an alternative criteria. Of course, the particular fixed route traversed at a selected time depends upon the particular application.

Figure 15:
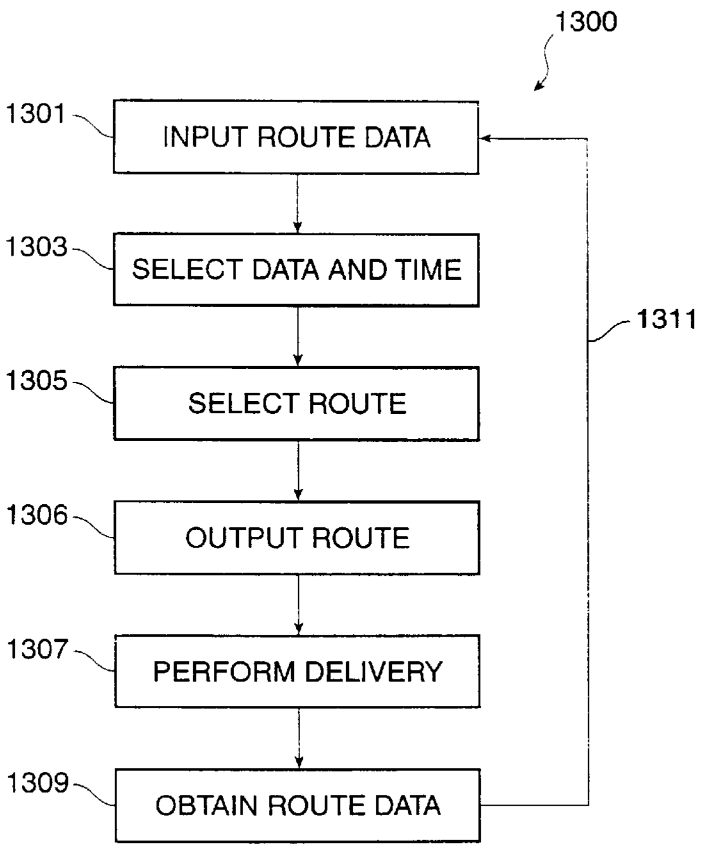
FIG. 15 is a simplified flow diagram of a route selection method according to the present invention.

FIG. 15 is a simplified flow diagram 1300 of a route selection method according to the present invention. The route selection method is performed on the computer aided dispatch system as previously described, but can also be performed on other computer aided dispatch systems and the like. The route selection method includes steps such as input route data 1301, select data and time 1303, select route 1305, output selected route 1306, perform delivery 1307, obtain route data 1309, and re-input route data via branch 1311, and others. The route selection method provides a selected route which improves at least delivery times for orders, and reduces costs related to such orders.

In step 1301, route data are input into memory of the computer aided dispatch system. The route data includes geographical locations of fixed routes, but also includes alternative routes. The route data further includes fleet mobile unit information such as vehicle types, history of traffic conditions for each of the fixed routes depending upon the time of year and other factors, and other information. A history of traffic conditions for the alternative routes are also input into the memory of the computer aided dispatch system.

The route selection method requires a time on a date (step 1303) for an order. The order generally includes a separate time on a date for pick-up and delivery, and additional information such as a pick-up location and a delivery location. The time and date can be supplied by a key input, or directly supplied via on-board clock on the computer aided dispatch system to the route selection method. The pick-up and delivery locations can be supplied by any of the previous embodiments, as well as other techniques.

Based upon the times, dates, and pick-up and delivery locations, the route selection method chooses (step 1305) a route for the order(s). In particular, the route selection method scans the history of selected routes including fixed and alternative routes, and determines which fixed route (or alternative route) has less stops and traffic congestion based upon the historical data at a selected time. For example, a particular route may be subject to traffic congestion at a selected time of day or even a selected day in the year based upon events such as people commuting to work, people driving to a sporting event on a holiday, people driving to a major shopping center during Christmas time, or the like.

In step 1306, the route selection method outputs a route to an output device. The output device can be a printer, a display, a memory, or any other means capable of reading the route. The output device can be at, for example, the dispatch location, a mobile unit location, or any other location. The route can also become the fixed route defined in step 1203 of the previous embodiment.

Based upon the route, the fleet mobile unit performs pick-up and delivery of the order(s) in step 1307. The delivery takes place upon the selected day and time for the particular pick-up location and destination. As the fleet mobile unit performs the pick-up and delivery, traffic information such as times, stops, and vehicle congestion is obtained via step 1309. The traffic information is fed back into the route selection method via branch 1311 to the input route data step 1301. Accordingly, the route selection method continuously updates its data base of historical route data upon each pick-up and delivery. The route selection method selects the same or different routes based upon the updated route data base and selected date and time in step 1303. By way of steps 1301 through 1309 via branch 1311, the route selection method provides an improved technique for route selection with each iteration through branch 1311.

Figure 16:
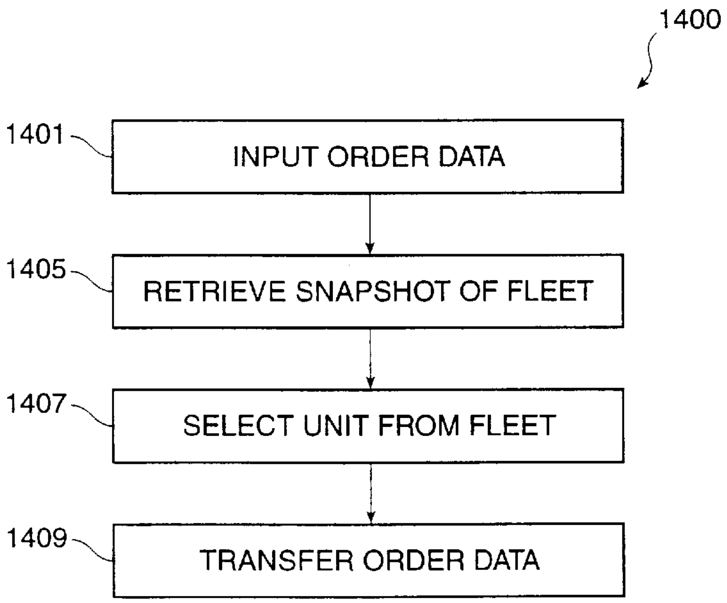
FIG. 16 is a simplified flow diagram of an on-line dispatching method according to the present invention.

FIG. 16 is a simplified flow diagram of an on-line dispatching method 1400 according to the present invention. The on-line dispatching method is performed on the computer aided dispatch system as previously described, but can also be performed on other computer aided dispatch systems and the like. The on-line dispatching method includes steps such as input order data 1401, retrieve snap-shot of fleet 1405, select unit from fleet 1407, transfer order data 1409, and others.

The on-line dispatching method provides real time dispatching (or in-situ dispatching) based upon the order and status of the fleet mobile units. As an example, the on-line dispatching method allows a customer to place an order via phone or other telecommunication device to the computer aided dispatching system, and the computer aided dispatching system transfers the order by way of two-way messaging or the like to the selected fleet mobile unit. The fleet mobile unit picks up the order and delivers the order to its delivery point. Pick-up and deliver can occur on the same day, or within the same period of day, or even the same hour and less. In preferred embodiments, the order can be picked up and delivered within a half an hour or less, or more preferably ten minutes and less.

The on-line dispatching method includes steps of receiving from a customer and inputting order data (step 1401). The order data include a pick-up time, a delivery time, a pick-up location, delivery location, and other information. The online dispatching method often occurs at, for example, the dispatch station or the like. The on-line dispatching method goes from the customer to the computer aided dispatch system, and then sent to the fleet mobile unit.

In step 1405, the on-line dispatching method retrieves a "snap-shot" status of the fleet mobile units. The "snap-shot" status can include information such as the aforementioned data in Table 7. In addition, the snap-shot status also includes a time, a vehicle location, a vehicle direction, and other information. The snap shot status is retrieved via the automatic vehicle location system, two-way massaging system, and other system elements. The snap shot status is stored into memory of the computer aided dispatch system.

The on-line dispatching method via processor identifies a fleet mobile unit (step 1407) from the "snap-shot" data which can pick-up and deliver the order within the parameters of the order data. For example, the order data requires a pick-up and delivery location to be in the downtown location. A fleet mobile unit at, for example, a downtown location would be the preferred candidate for pick-up and delivery of the order for the downtown location. Alternatively, a fleet mobile unit closest to the pick-up location and heading into the pick-up location would be a preferred candidate for the order. Alternatively, a fleet mobile unit without any orders, and near the pick-up location and heading toward the pick-up location would be the preferred candidate for the order. Of course, other parameters can also be used for selecting the fleet mobile unit depending upon the particular application.

Upon completion of the step 1409, the on-line dispatching method transfers selected order data to the selected fleet mobile unit. The order data may be transferred via the two-way messaging system, or the computer aided dispatch system, or the like. The fleet mobile unit receives the selected order data and performs the pick-up and delivery of the order within the specified time limits. Data corresponding to the pick-up and delivery are transferred via the automatic vehicle location system to the computer aided dispatch system or the like.

In summary, a novel technique has been described for combining raster and vector information. While the invention has been described with reference to the illustrated embodiment, this description is not intended to be construed in a limiting sense. For example, the computer platform used to implement the above embodiments include 586 class based computers, Power PC based computers, Digital ALPHA based computers, SunMicrosystems SPARC computers, etc.; computer operating systems may include WINDOWS NT, DOS, MacOs, UNIX, VMS, etc.; programming languages may include C, C++, Pascal, an object-oriented language, etc. Various modifications of the illustrated embodiment as well as other embodiments of the invention will become apparent to those persons skilled in the art upon reference to this description. In addition, a number of the above processes could be separated or combined and the various embodiments described should not be limiting. It will be understood, therefore that the invention is defined not by the above description, but by the appended claims.

What is claimed is:

1. A system for fleet management, said system comprising:

a graphical user interface apparatus comprising a display and a user interface, said graphical user interface apparatus including a central processor;

a main process manager operably coupled to said display through said central processor;

a current report receiver operably coupled to said display through said central processor; and a history report receiver operably coupled to said display through said central processor, wherein said history report receiver transfers a historical vehicle position report from a mobile information center to said graphical user interface apparatus.

2. The system of claim 1 wherein said mobile information center is operably coupled to said main process manager.

3. The system of claim 2 wherein said main process manager provides one or more communication channels between said graphical user interface apparatus and said mobile information center.

4. The system of claim 1 wherein said main process manager spawns a child process configured to perform a selected function.

5. The system of claim 1 wherein said current report receiver transfers a current vehicle position report from said mobile information center to said graphical user interface apparatus.

6. The system of claim 1 further comprising a computer aided dispatch station operably coupled to said graphical user interface apparatus.

7. The system of claim 1 further comprising a computer aided dispatch station operably coupled to a geocoder.

8. The system of claim 1 further comprising a plurality of servers operably coupled to said historical report receiver.

9. The system of claim 8 further comprising a memory operably coupled to one of said plurality of servers.

10. The system of claim 9 wherein said memory is a shared memory.

11. The system of claim 10 further comprising a plurality of fleet terminals operably coupled to said shared memory.

12. The system of claim 1 further comprising a server operably coupled to said main process manager.

13. The system of claim 1 further comprising a two-way messaging system operably coupled between said graphical user interface apparatus and a fleet terminal.

14. The system of claim 1 wherein said graphical user interface comprises a keyboard.

15. The system of claim 1 wherein said display displays information including a raster map and vector information.

16. A system for fleet management, said system comprises:

a client process operably coupled to a user interface apparatus, said client process providing vehicle position data to said user interface apparatus, said vehicle position data comprising a vehicle latitude/longitude and a vehicle address; and a geocoder operably coupled to said client process, said geocoder comprising a search engine and a library, said library comprising latitude and longitude data and address data, said geocoder converts said vehicle latitude/longitude into said vehicle address.

17. The system of claim 16 wherein said geocoder is coupled to said client process using a TCP/IP protocol.

18. The system of claim 16 wherein said client process is a current report receiver.

19. The system of claim 18 wherein said current report receiver transfers a current vehicle position report from a mobile information center to said user interface apparatus.

20. The system of claim 16 wherein said client process is a history report receiver.

21. The system of claim 20 wherein said history report receiver transfers a historical vehicle position report from a mobile information center to said user interface apparatus.

22. The system of claim 16 further comprising a mobile information center operably coupled to said client process.

23. A method for fleet management comprising:

providing a vehicle latitude/longitude from a vehicle;

transferring said vehicle latitude/longitude into a client process, said client process operably coupled to a user interface apparatus;

transferring said vehicle latitude/longitude from said client process into a geocoder, said geocoder being operably coupled to said client process, said geocoder comprising a search engine and a library, said library comprising latitude and longitude data and address data;

converting said vehicle latitude/longitude using said search engine and said library in said geocoder to a vehicle address; and using said vehicle address in a graphical user interface apparatus.

24. The method of claim 23 wherein said transferring to said geocoder is provided using a TCP/IP protocol.

25. The method of claim 23 wherein said client process is a current report receiver.

26. The method of claim 23 wherein said client process is a history report receiver.

27. The method of claim 23 wherein said vehicle latitude/longitude is provided from a mobile information center.

28. A system for fleet management, said system comprising:

a user interface apparatus comprising a display, a user interface, and a central processor;

a main process manager operably coupled to said display through said central processor;

a first report receiver operably coupled to said display through said central processor;

a second report receiver operably coupled to said display through said central processor; and a computer aided dispatch station operably coupled to said user interface apparatus.

29. The system of claim 28 further comprising a mobile information center operably coupled to said main process manager.

30. The system of claim 29 wherein said main process manager provides one or more communication channels between said user interface apparatus and said mobile information center.

31. The system of claim 29 wherein said first report receiver comprises a current report receiver, said current report receiver transferring a current vehicle position report from said mobile information center to said user interface apparatus.

32. The system of claim 29 wherein said second report receiver comprises a history report receiver, said history report receiver transferring a historical vehicle position report from said mobile information center to said user interface apparatus.

33. The system of claim 28 wherein said main process manager spawns a child process configured to perform a selected function.

34. The system of claim 28 further comprising a plurality of servers operably coupled to said second report receiver.

35. The system of claim 34 further comprising a memory operably coupled to one of said plurality of servers.

36. The system of claim 35 wherein said memory is a shared memory.

37. The system of claim 36 further comprising a plurality of fleet terminals operably coupled to said shared memory.

38. The system of claim 28 further comprising a server operably coupled to said main process manager.

39. The system of claim 28 further comprising a two-way messaging system operably coupled between said user interface apparatus and a fleet terminal.

40. The system of claim 28 wherein said user interface comprises a keyboard.

41. The system of claim 28 wherein said display displays information including a raster map and vector information.

* * * * *